US010613527B2

(12) United States Patent
D'Andrea et al.

(10) Patent No.: US 10,613,527 B2
(45) Date of Patent: Apr. 7, 2020

(54) INVISIBLE TRACK FOR AN INTERACTIVE MOBILE ROBOT SYSTEM

(71) Applicant: Verity Studios AG, Zurich (CH)

(72) Inventors: Raffaello D'Andrea, Wollerau (CH); Markus Waibel, Zurich (CH); Mark Mueller, San Francisco, CA (US); Markus Hehn, Zurich (CH)

(73) Assignee: Verity Studios AG, Zurich (CH)

( * ) Notice: Subject to any disclaimer, the term of this patent is extended or adjusted under 35 U.S.C. 154(b) by 262 days.

(21) Appl. No.: 15/504,926

(22) PCT Filed: Aug. 18, 2015

(86) PCT No.: PCT/CA2015/050783
§ 371 (c)(1),
(2) Date: Feb. 17, 2017

(87) PCT Pub. No.: WO2016/026039
PCT Pub. Date: Feb. 25, 2016

(65) Prior Publication Data
US 2017/0269586 A1   Sep. 21, 2017

Related U.S. Application Data

(60) Provisional application No. 62/038,413, filed on Aug. 18, 2014.

(51) Int. Cl.
*G05D 1/00* (2006.01)
*G05D 1/02* (2020.01)
(Continued)

(52) U.S. Cl.
CPC .......... *G05D 1/0016* (2013.01); *A63H 17/26* (2013.01); *A63H 30/04* (2013.01); *G01S 1/00* (2013.01);
(Continued)

(58) Field of Classification Search
CPC .......... A63H 17/26; A63H 30/04; G01S 1/00; G01S 5/02; G01S 5/0294; G05D 1/0016;
(Continued)

(56) References Cited

U.S. PATENT DOCUMENTS 6,354,946 B1   3/2002   Finn
6,466,168 B1   10/2002  McEwan
(Continued)

FOREIGN PATENT DOCUMENTS

EP   1219047 B1   5/2010
EP   1334372 B1   3/2013
(Continued)

OTHER PUBLICATIONS

International Search Report and Written Opinion of the International Searching Authority for application No. PCT/CA2015/050783, dated Nov. 3, 2015.

*Primary Examiner* — Rachid Bendidi
(74) *Attorney, Agent, or Firm* — Haley Guiliano LLP; James A. Leiz

(57) ABSTRACT

An interactive mobile robot system and a method for creating an invisible track for a mobile robot. The system and method allow the creation of invisible tracks by guiding objects. They also allow the use of such invisible tracks for the semi-autonomous or autonomous control of toys, including model cars and model trains, or of mobile robots to move them along a real-world path. The system includes a mobile robot, receiver circuitry to receive one or more position signals, and processing circuitry. The processing circuitry is configured to determine position information associated with the mobile robot based on the one or more position signals. The processing circuitry is further configured to create an invisible track based on the position information, to determine a current position of the mobile robot, and to (Continued)

generate control signals based on the current position of the mobile robot and the invisible track.

20 Claims, 16 Drawing Sheets

(51) Int. Cl.
*A63H 30/04* (2006.01)
*A63H 17/26* (2006.01)
*G01S 1/00* (2006.01)
*G01S 5/02* (2010.01)

(52) U.S. Cl.
CPC .............. *G01S 5/02* (2013.01); *G05D 1/0022* (2013.01); *G05D 1/028* (2013.01); *G05D 1/0221* (2013.01); *G01S 5/0294* (2013.01); *G05D 2201/0214* (2013.01)

(58) Field of Classification Search
CPC .... G05D 1/0022; G05D 1/0221; G05D 1/028; G05D 2201/0214
See application file for complete search history.

(56) References Cited

U.S. PATENT DOCUMENTS

| | | | |
|---|---|---|---|
| 6,585,597 B2 | 7/2003 | Finn | |
| 6,661,342 B2 | 12/2003 | Hall et al. | |
| 6,695,668 B2 | 2/2004 | Donahue et al. | |
| 6,763,282 B2 | 7/2004 | Glenn et al. | |
| 6,768,944 B2 | 7/2004 | Breed et al. | |
| 6,868,314 B1 | 3/2005 | Frink | |
| 6,879,878 B2 | 4/2005 | Glenn et al. | |
| 6,895,301 B2 | 5/2005 | Mountz | |
| 7,023,833 B1 | 4/2006 | Aiello et al. | |
| 7,031,294 B2 | 4/2006 | Aiello et al. | |
| 7,038,589 B2 | 5/2006 | Schmidt et al. | |
| 7,069,111 B2 | 6/2006 | Glenn et al. | |
| 7,403,783 B2 | 7/2008 | Cheok et al. | |
| 7,555,370 B2 | 6/2009 | Breed et al. | |
| 7,574,219 B2 | 8/2009 | Rofheart et al. | |
| 7,592,944 B2 | 9/2009 | Fullerton et al. | |
| 7,610,146 B2 | 10/2009 | Breed | |
| 7,636,062 B2 | 12/2009 | Ward et al. | |
| 7,758,399 B2 | 7/2010 | Weiss et al. | |
| 7,768,394 B2 | 8/2010 | Amidi | |
| 7,783,385 B2 | 8/2010 | Tamura | |
| 7,839,916 B1 | 11/2010 | Luecke et al. | |
| 7,962,285 B2 | 6/2011 | Breed | |
| 7,974,264 B2 | 7/2011 | Rothschild | |
| 7,979,172 B2 | 7/2011 | Breed | |
| 7,983,694 B2 | 7/2011 | Cheok et al. | |
| 8,010,133 B2 | 8/2011 | Cheok et al. | |
| 8,031,690 B2 | 10/2011 | Aiello et al. | |
| 8,040,859 B2 | 10/2011 | Chowdhury et al. | |
| 8,160,609 B2 | 4/2012 | Alles et al. | |
| 8,169,319 B2 | 5/2012 | Kaplan et al. | |
| 8,203,487 B2 | 6/2012 | Hol et al. | |
| 8,214,147 B2 | 7/2012 | Cheok et al. | |
| 8,248,263 B2 | 8/2012 | Shervey et al. | |
| 8,271,132 B2 | 9/2012 | Nielsen et al. | |
| 8,284,100 B2 | 10/2012 | Vartanian et al. | |
| 8,319,687 B2 | 11/2012 | Kahle | |
| 8,353,737 B2 | 1/2013 | Sofman et al. | |
| 8,371,900 B2 | 2/2013 | Haas et al. | |
| 9,233,314 B2 | 1/2016 | Keating et al. | |
| 9,296,411 B2 | 3/2016 | Hornberger | |
| 2005/0240309 A1* | 10/2005 | Bischoff | G05B 19/423 700/245 |
| 2008/0026671 A1 | 1/2008 | Smith et al. | |
| 2008/0234930 A1 | 9/2008 | Cheok et al. | |
| 2009/0081923 A1 | 3/2009 | Dooley et al. | |
| 2009/0234499 A1* | 9/2009 | Nielsen | B25J 9/161 700/250 |
| 2012/0165012 A1 | 6/2012 | Fischer et al. | |
| 2012/0290168 A1 | 11/2012 | De et al. | |
| 2014/0116469 A1* | 5/2014 | Kim | A47L 9/2894 134/18 |
| 2015/0147936 A1 | 5/2015 | Hornsby et al. | |
| 2015/0185734 A1* | 7/2015 | Minoiu-Enache | G01C 21/3415 701/25 |

FOREIGN PATENT DOCUMENTS

| | | |
|---|---|---|
| FR | 2993376 A1 | 1/2014 |
| WO | WO-2001/95278 A1 | 12/2001 |
| WO | WO-2005/081012 A1 | 9/2005 |
| WO | WO-2008/116168 A1 | 9/2008 |
| WO | WO-2012/034832 A1 | 3/2012 |

* cited by examiner

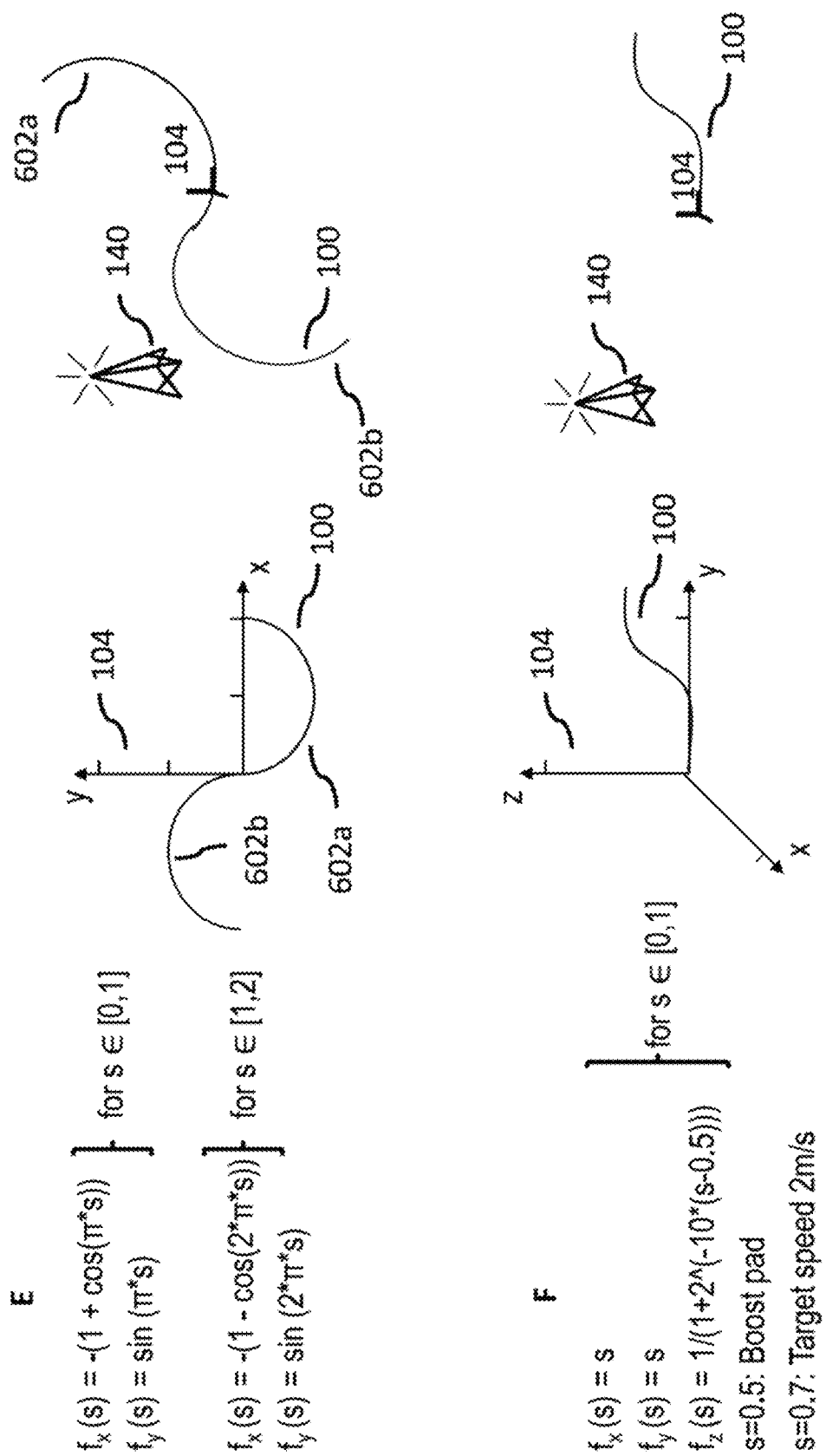

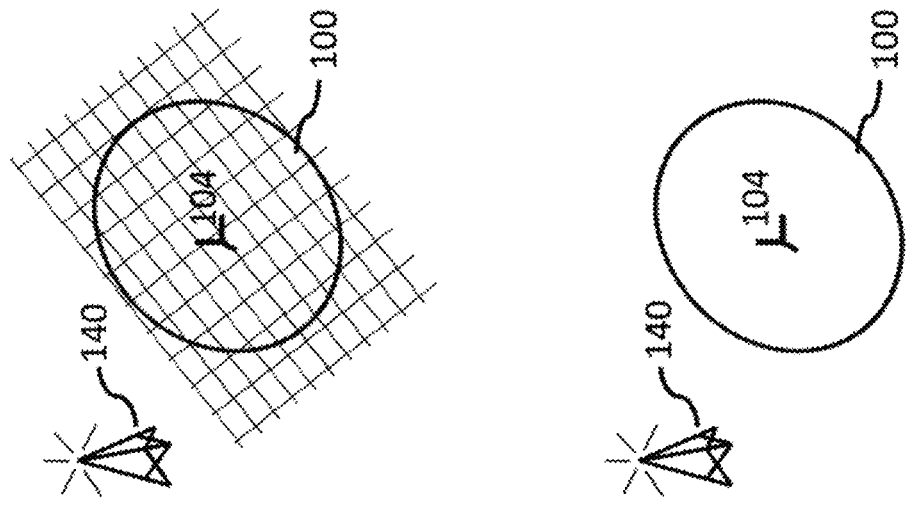
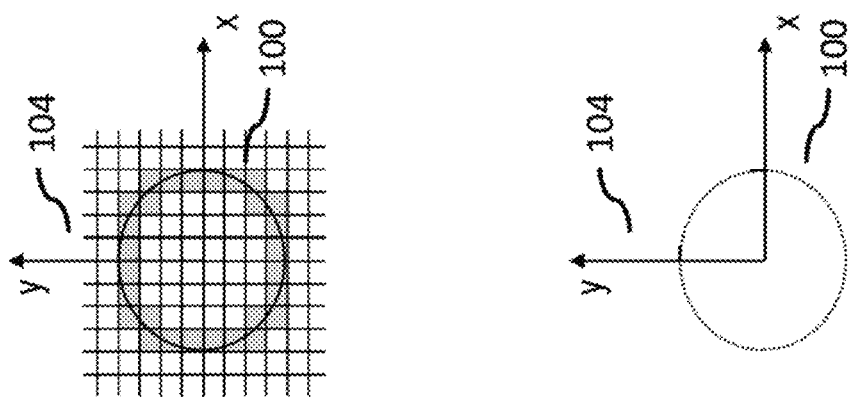
Figure 6

INVISIBLE TRACK FOR AN INTERACTIVE MOBILE ROBOT SYSTEM

CROSS-REFERENCE TO RELATED APPLICATIONS

This application is a United States National Phase Application filed under 35 U.S.C. § 371 from International Patent Application No. PCT/CA2015/050783, filed on Aug. 18, 2015, which is hereby incorporated by reference herein in its entirety, and which claims priority to U.S. Provisional Patent Application No. 62/038,413, filed on Aug. 18, 2014.

FIELD OF THE INVENTION

The present disclosure relates to the creation of invisible tracks by guiding objects and to uses of such invisible tracks for the semi-autonomous or autonomous control of toys, including model cars and model trains, or of mobile robots to move them along a real-world path.

BACKGROUND OF THE INVENTION

Tracks for toys, including model cars and model trains, are widely used to have toys follow a course. Often the tracks are simultaneously used to supply toys with power or to control a toy's movement along the track. One of the most popular version of toy tracks is that used for slot cars, where vehicles are guided by, powered through, and controlled via a slot or groove in the track on which they run. Tracks are also widely used for toy trains, from simple wooden toy train tracks to a complex variety of scales and gauges used for model train tracks. In other toys, molded plastic channels are used as a track for guiding small racecars around a course and through loops. Yet other toys use metal or plastic tubes and various other materials to construct tracks in two or three dimensions.

Most toy tracks are sectional, with specific pieces like straights and turns that may be connected to form a course. However, so-called routed tracks, with the entire course made from one or a few pieces, are also sometimes used. While they do not offer the flexibility of reconstructing new courses found in sectional tracks, tend to be more expensive, and often require permanent setup, such routed tracks allow a consistent and smooth surface often used for racing and eliminate common problems when powering vehicles via the track (e.g., voltage drops) or when controlling vehicles via the track (e.g., connectivity problems).

Tracks for mobile robots come in various forms, such as rails or grooves, lines painted on the ground, or wires embedded in the ground. Rails and grooves are often used to mechanically guide a mobile robot's wheels. Painted lines are used by so-called line following robots, typically by using a vision sensor like a camera to detect the position of the line in an image. Wires embedded in the ground are used in some industrial applications, where mobile robots typically detect their presence using induction.

BRIEF SUMMARY OF THE INVENTION

In accordance with the present disclosure, limitations of current tracks for toys and mobile robots have been substantially reduced or eliminated. In particular, an invisible track is provided that may be used to guide, help control, or otherwise affect mobile robots or toys. The invisible track may be created by recording and storing sensor information when a toy, a mobile robot, or another object is moved along a desired course, and by processing the sensor information (e.g., by computing fitting functions). The invisible track may consist of one or more invisible track segments that may be joined in various ways. The invisible track may then be used, for example, to change the movement of a toy or mobile robot by using sensors to detect the toy or mobile robot's current position with respect to a coordinate system, by then comparing this current position to information stored in an invisible track, by determining a corresponding corrective action to change the movement of a toy or mobile robot, and by using a control module connected to motors or other actuators on the mobile robot or toy to compute control signals to execute the corrective action.

Technical advantages of certain embodiments of the present invention allow eliminating the need for a physical track. This may dramatically reduce the setup and take down times of tracks by no longer requiring assembly and installation as well as disassembly and removal of physical track segments. It may also make the track more convenient to use by not cluttering the environment and allowing tracked toys and mobile robots to be used without creating additional obstacles for other uses of a space. Furthermore, eliminating the requirement of a physical track may improve the accessibility to various portions of the track, such as the center of a complex track layout, which would normally be blocked from easy access by surrounding track segments. Moreover, it may contribute to a healthier, dust-free environment by allowing easy cleaning of the space. In addition, it may remove constraints imposed on the shape, length, width, area, or complexity of a desired track, currently limited by the number of available track segments or by the restriction to a single, fixed track. In particular, it may allow three dimensional (3D) tracks for mobile robots.

Other technical advantages of certain embodiments linked to the elimination of the need for a physical track are related to the transport, interaction with, installation, and cost of tracked toys and mobile robots. The present disclosure may make tracked mobile robots and toys easier to transport by eliminating the current need to also transport a toy or mobile robot's tracks, and may make it easier to move tracks somewhere else by simply moving a toy or a toy beacon or anchor. Furthermore, it may allow seamless interaction between mobile robots, toys and their environment. For example, a player may create an invisible track that will cause their toy car to drive first over a hardwood floor, then across a carpet, and then up a cardboard ramp, across a stack of books and around a table lamp. In addition, creating and using an invisible track may reduce costs compared to current solution, for example when the costs of physical tracks or track segments are higher than the costs of using the combination of sensors and software disclosed herein to create and use an invisible track instead.

Yet other technical advantages of certain embodiments of the present invention may allow creating invisible track segments. Such invisible track segments may, for example, be modeled on physical track segments commonly used in toys, or may be made arbitrarily complex. They may be created from, or disassembled into, one or more invisible track segments. Such invisible track segments may be used in much the same ways invisible tracks may be used.

Yet other technical advantages of certain embodiments of the present invention may allow more convenient or entirely new uses of tracks. For example, they may allow for the easy creation of a limitless number of invisible tracks, including curves, bends, or crossings with a large variety of shapes and dimensions, that may be exchanged between or shared by users, or for the easy combination of such invisible tracks or their segments into endless (e.g., figure eight) courses or non-endless (e.g., A to B) courses of arbitrary complexity. In some embodiments, invisible tracks may be used to execute specific maneuvers, stunts, or motion (e.g., moving a robot arm or aiming a camera based on an invisible track). In some embodiments, invisible tracks may be traded, edited, or otherwise used by one or multiple users.

Yet other technical advantages of certain embodiments of the present invention may allow to better monitor or to record a mobile robot's or toy's movement or motion along the track. For example, they may allow providing real-time statistics to a player playing with a toy (e.g., the number of laps, total distance traveled, the maximum speed, or the maximum height and distance of a jump), or it may be used to trigger game events.

Yet other technical advantages of certain embodiments of the present invention may allow a track to be augmented (associated) with additional attributes. For example, a section of a track may automatically impose speed limits or otherwise affect the movement of a mobile robot or toy, or may be associated with music, sound, lights, or other game events or effects, resulting in greater value for users.

Yet other technical advantages of certain embodiments of the present invention may allow a mobile robot or toy to be more easily controlled along the track by a user by partially delegating control tasks to a control program and semi-autonomously driving a toy or mobile robot. Yet other technical advantages of certain embodiments of the present invention may result from the combination of, and interaction between, an invisible track and a control program that drives a toy or mobile robot along the track. Yet other technical advantages may allow to control parts of or all of the movements of one or of multiple toys or mobile robots along parts of or all of an invisible track's sections part of or all of the time with the help of a control program for a more entertaining experience or to increase their performance.

Yet other technical advantages of certain embodiments of the present invention may allow improving the performance of one or more mobile robots following an invisible track. For example, an invisible track may allow using a dynamic model of a mobile robot to determine its operational limits using mathematical derivation, simulation, or observation.

Yet other technical advantages of certain embodiments of the present invention may allow invisible tracks to be improved over time. For example, invisible tracks may be refined or improved by users or automatically, e.g. using machine learning.

Yet other technical advantages of certain embodiments of the present invention may allow the creation of an invisible track without the need for a mechanical connection between the mobile robot and the track or its related elements (e.g., cables, tethers, mechanical connections); without the need for line of sight between the mobile robot and the track or its related elements (e.g., guide signals, vision systems); without the need for a graphical user interface; and without the need for a programming interface.

Other technical advantages of the present invention will be readily apparent to one skilled in the art from those following figures, descriptions, and claims. Moreover, while specific advantages have been enumerated above, various embodiments may include all, some, or none of the enumerated advantages.

According to a first aspect of the present disclosure, there is provided an interactive mobile robot system, comprising a mobile robot, receiver circuitry configured to receive one or more position signals, and processing circuitry coupled to the receiver circuitry, wherein the processing circuitry is configured to (1) determine position information associated with the mobile robot based on the one or more position signals, (2) create an invisible track in a coordinate space based on the position information, and (3) determine a current position of the mobile robot in the coordinate space based on at least one of the one or more position signals.

In some embodiments, the processing circuitry is further configured to generate one or more control signals based on the current position of the mobile robot and the invisible track, wherein the one or more control signals affect the movement of the mobile robot.

In some embodiments, the interactive mobile robot system consists of a mobile robot and a multitude of positioning anchors that create one or more position signals. In some embodiments position signals are received from at least two, or three, positioning anchors. In some embodiments the positioning anchors can be placed by a user. In some embodiments the positions and orientations of the positioning anchors are substantially fixed while determining the position information, while determining the current position, and while the one or more control signals affect the movement of the mobile robot.

In some embodiments the interactive mobile robot system uses sensors onboard the mobile robot to determine the position information and the current position. In some embodiments the interactive mobile robot system uses sensors onboard and offboard the mobile robot to determine the position information and the current position.

In some embodiments, the mobile robot is prepared and adapted for manual guiding by a user. In some embodiments, the positioning anchors are prepared and adapted for manual placement by a user. In some embodiments, the interactive mobile robot system is prepared and adapted to allow the position information to be determined based on the manual guiding.

In some embodiments, the interactive mobile robot system is structured and arranged to allow the position information to be determined based on the interaction between the user and an object, wherein the object is one of the mobile robot, a positioning anchor, and a remote control.

In some embodiments, the processing circuitry is further configured to create the invisible track based on at least one of the relative time sequence, distance, and direction between a first and a second position information of the mobile robot, wherein the mobile robot is positioned at the first and the second position by a user.

In some embodiments, the processing circuitry is further configured to create the invisible track based on the first and the second position information being generated based on at least one of a motion of the mobile robot, the movement of the mobile robot, and the press of a button.

Some embodiments of the interactive mobile robot system include one or more of a base station, one or more positioning anchors, and a multitude of mobile robots.

In some embodiments, the mobile robot is a toy. In some embodiments, the toy is at least one of a dynamic or a self-propelled toy, where dynamic toys are toys whose movements depend on time and can be described using Newton's second law of motion and where inertia has a substantial effect on the movement of the toy.

In some embodiments, at least one of the receiver and processing circuitry is carried on board of the mobile robot.

In some embodiments, at least one of the receiver and processing circuitry is located on at least one positioning anchor. In some embodiments, positioning anchors are electrically powered and can be placed by a user.

In some embodiments, the receiver circuitry is further configured to receive a user input signal and the processing circuitry is further configured to determine the position information based on the user input signal and the one or more position signals. In some embodiments, the processing circuitry is further configured to determine the position information based on the one or more position signals and a semi-autonomous or autonomous movement of the mobile robot. In some embodiments, the receiver circuitry is further configured to receive the one or more position signals over a distance of at least one meter, or over a distance of at least ten meters. In some embodiments, the receiver circuitry is further configured to receive the one or more position signals over a distance of at most one kilometer, or over a distance of at most ten kilometers.

In some embodiments, the mobile robot comprises an actuator operationally coupled to the processing circuitry, wherein the actuator is structured and arranged to allow controlling at least one of a speed of the mobile robot and a direction of the mobile robot based on at least one of the one or more control signals.

In some embodiments, the mobile robot further comprises a steering actuator coupled to the processing circuitry, wherein the steering actuator is configured to control the steering direction of the mobile robot based on at least one of the one or more control signals.

In some embodiments, the processing circuitry is configured to control the movement of the mobile robot to cause the mobile robot to follow the invisible track based on the one or more control signals autonomously.

In some embodiments, the receiver circuitry is further configured to receive a user input signal and the processing circuitry is configured to generate the one or more control signals based on the current position, the invisible track, and the user input signal, whereby the mobile robot follows the invisible track semi-autonomously.

In some embodiments, the receiver circuitry is further configured to receive the user input signal from a remote control device (sometimes: remote controller).

In some embodiments, the mobile robot further comprises a sensor, and the processing circuitry is further configured to receive sensor signals indicative of a physical interaction between the user and the mobile robot.

In some embodiments, the mobile robot further comprises one or more sensors from the group of accelerometers, gyroscopes, magnetometers, cameras, optical flow sensors, barometers, or infra-red sensors.

In some embodiments, the mobile robot further comprises one or more sensors from the larger group of accelerometers, gyroscopes, magnetometers, cameras, optical flow sensors, laser or sonar range finders, radar, barometers, thermometers, hygrometers, bumpers, chemical sensors, electromagnetic sensors, air flow sensors or relative airspeed sensors, ultra sound sensors, microphones, radio sensors, or other height, distance, or range sensors, or infra-red sensors.

In some embodiments, the mobile robot further comprises a sensor, which is arranged to detect data representative of the operation of at least one of the effectors used for the movement of the mobile robot.

Some embodiments comprise a global property sensor, i.e. a sensor operable to provide data representative of a global property. In some embodiments an anchor, a mobile robot, or a remote controller comprise a global property sensor. In some embodiments a mobile robot and one of an anchor and a remote controller each comprise a global property sensor. In some embodiments the global property depends on a position, orientation, or movement of the sensor. In some embodiments a mobile robot and one of an anchor and a remote controller are both structured and arranged to detect the same global property. In some embodiments an anchor is structured and arranged to communicate data representative of the global property at its location to a mobile robot, and the mobile robot is structured and arranged to compare said data with data representative of the same global property at the mobile robot's location. In some embodiments the global property can be associated with a global property model.

In some embodiments the global property is one of a radio frequency (RF) signal strength, an atmospheric pressure, an electromagnetic field, a magnetic field, a Global Navigation Satellite System (GNSS) signal, the relative position of a landmark, and gravity.

In some embodiments the global property sensor is an orientation sensor. The orientation sensor may enable the anchor to measure its orientation relative to a frame of reference common to the anchor and the mobile robot. The anchor may then transmit signals representative of its orientation included as data (payload) within the positioning signals. In some embodiments an anchor is capable of measuring its orientation and of transmitting this orientation as a payload of positioning signals.

In some embodiments the global property sensor is a visual sensor, structured and arranged to observe the environment. An example of a global property that can be observed by a visual sensor is a landmark. Examples include the horizon, stars such as the sun or those used in celestial navigation, distinctive natural features such as mountains, distinctive buildings such as monuments, and others such as those used in simultaneous localization and mapping (SLAM). The detected visual features may vary. Examples include those used in Scale-Invariant Feature Transform (SIFT) and Speeded Up Robust Features (SURF).

Global properties may allow a more accurate computation of the relative location of the mobile robot by providing additional reference data with respect to a reference point (e.g., a coordinate system). This can be achieved by equipping at least one anchor and a mobile robot to detect the global property. The positioning accuracy may be improved by a method comprising the steps of: (i) transmitting an anchor's global property reading to a mobile robot, by (ii) comparing the anchor's reading of the global property at its location and the mobile robot' reading of the global property at its location, by (iii) using a model of the global property ("global property model") to translate the comparison into data related to an orientation, position, or movement, and (iv) by appropriately fusing that data with other sensor data by using an evaluation unit (e.g., implementing an estimator). Steps (ii) and (iii) may be accomplished using an evaluation unit. Global property models allow conversion of one or more readings of a global property into data that can be processed by the evaluation unit (e.g., the equation describing atmospheric pressure as a function of altitude/height). Models can take various forms, such as functions or look-up tables.

In some embodiments the evaluation unit may compute a location of the mobile robot in dependence of a global property. In some embodiments the evaluation unit may compute the location of the mobile robot in dependence of the difference between a global property measured by a mobile robot and a global property measured by one or more of the anchors, a remote controller, or other mobile robots (e.g., if both mobile robot and an anchor measure air pressure, the relative altitude difference between the two can be computed according to the known relationship between altitude and air pressure).

In some embodiments, the receiver circuitry comprises at least one antenna. In some embodiments, the receiver circuitry is configured to receive at least two position signals from at least two positioning anchors. In some embodiments, the receiver circuitry is further configured to allow for receiving the at least two position signals at least once per second, or at least five times per second. In some embodiments, the processing circuitry is configured for determining the position information at least once per second, or at least five times per second. In some embodiments, the receiver circuitry is further configured to allow for receiving the at least two position signals from at least two, or from at least three locations.

In some embodiments, the one or more position signals are wireless signals. In some embodiments, the wireless signals are ultra-wideband localization radio signals.

In some embodiments, the positioning anchors are at least one of wireless transmitters and wireless receivers. In some embodiments, the positioning anchors are optical sensors. In some embodiments, the positioning anchors are part of a motion capture ("Mo-cap" or "motion tracking") system.

In some embodiments the system comprises at least two anchors or at least three anchors.

In some embodiments, the invisible track comprises one or more attributes each associated with a location on the invisible track or a segment of the invisible track. In some embodiments, the one or more attributes comprise one or more of a desired robot orientation, a desired robot velocity, a desired robot acceleration, a desired track width, a desired time, or a desired time sequence. In some embodiments, the one or more attributes are used to trigger an event related to at least one of the movement of the mobile robot, a signal to a user, or a safety or game event.

In some embodiments, the invisible track comprises a single continuous path.

In some embodiments, the invisible track comprises at least one fork that leads to at least two alternative paths and at least one merge that combines at least two alternative paths to a single path.

In some embodiments, the invisible track comprises one or more of invisible track segments and waypoints.

In some embodiments, the processing circuitry is configured to determine the position information at a plurality of locations in the coordinate space. In some embodiments the processing circuitry is configured to create the invisible track by fitting a plurality of track segments to the plurality of locations in the coordinate space. In some embodiments, the plurality of locations is a sequence of locations in time.

In some embodiments, the processing circuitry is further configured to refine the invisible track based on at least one of user instructions, dynamics of the mobile robot, and detected obstacles. In some embodiments the dynamics are one or more of observed dynamics, simulated dynamics, or mathematically derived dynamics.

According to another aspect of the present disclosure, a method for creating an invisible track for a mobile robot is provided, the method comprising (1) receiving an indication to start recording an invisible track, (2) receiving first position information of an object wherein the object was positioned at a first position by a user, (3) receiving second position information of the object wherein the object was positioned at a second position different from the first position by a user, and (4) creating an invisible track based on the first and the second position information.

In some embodiments, the method comprises receiving an indication that a wireless positioning system is operational.

In some embodiments, the method comprises creating the invisible track based on at least one of the relative time sequence, distance, and direction of the first and the second position information.

In some embodiments, the method comprises one or more of determining position information associated with a mobile robot based on one or more wireless signals, determining a current position of the mobile robot in a coordinate space based on at least one of the one or more wireless signals, and generating one or more control signals based on a relative difference between the current position of the mobile robot and the invisible track, wherein the one or more control signals control the movement of the mobile robot.

In some embodiments, the object is one of the mobile robot, an anchor, and a controller.

In some embodiments, the first and second position information of the object are generated based on one or more of a motion of the object, the movement of the mobile robot, and the press of a button.

In some embodiments, the motion is one or more of a manual guiding motion of the object along a track segment and a repetitive motion comprising one of a back-and-forth motion, a spinning motion, and a tapping motion.

In some embodiments, the method comprises receiving an indication to execute the control program, executing a control program, and receiving an indication to stop executing the control program. In some embodiments, the one or more control signals are produced when executing the control program.

In some embodiments the invisible track is a three dimensional invisible track. In some embodiments the position information is determined in dependence of at least one position signal and at least one onboard sensor signal. In some embodiments the control program controls the movement of the mobile robot in dependence of a position signal, an onboard sensor signal, an attribute, a global property, or a user control input. In some embodiments the control program controls the movement of the mobile robot such that it follows the invisible track semi-autonomously.

BRIEF DESCRIPTION OF THE FIGURES

Some embodiments of the present invention are described in detail below with reference to the following figures.

DETAILED DESCRIPTION OF SOME EMBODIMENTS OF THE INVENTION

In some embodiments of the present invention, an invisible track may be used with toys. The invisible track may be created by first recording sensor data while a toy is guided through an obstacle course created from every-day items in a home (e.g., books, chairs, cardboard ramps, children's toys, etc.) by a player and then processing the sensor data to compute an invisible track. The computed invisible track may then be used as part of a game to automate certain functions of a toy car.

Figure 1:
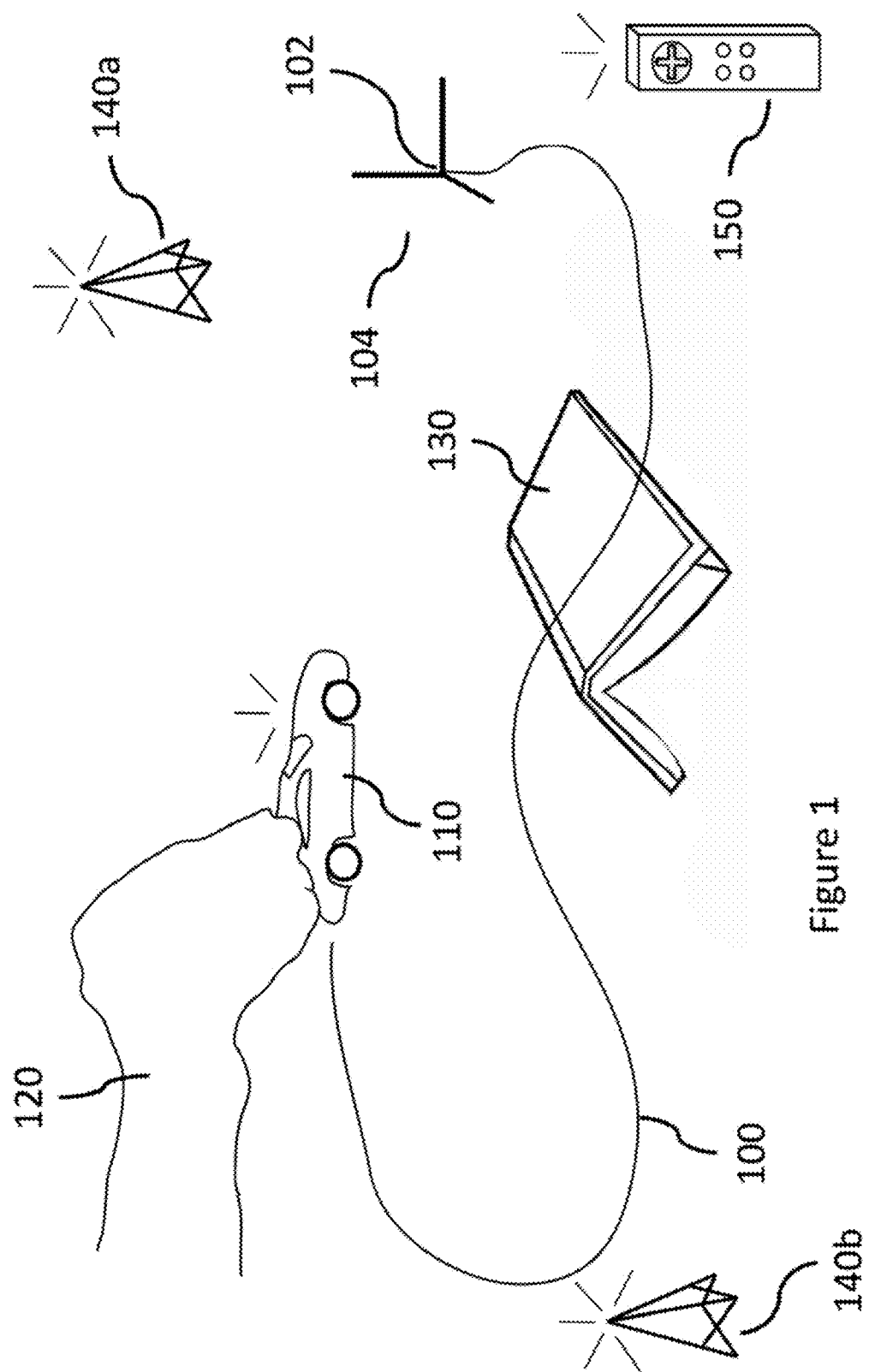
FIG. 1 shows an example embodiment where a user plays with a toy car that is a mobile robot, and guides the toy along a desired invisible track. It is used to explain the present disclosure from a player's perspective.

FIG. 1 shows exemplary embodiments to explain first exemplary actions of creating an invisible track as experienced by a user 120 (or "player") playing with a toy 110. The user's hand 120 is seen during the process of recording a desired invisible track 100 by manually guiding a toy car 110 on a surface and across an obstacle 130. Positioning anchors 140 (or "beacons" or "wireless transmitters") are set up in the vicinity of the desired track and may be used for sensing. Remote controls 150 or other toys (none shown) may also be used to provide additional sensing.

To start a recording, a player 120 places a toy 110 at the desired start location 102 of a desired invisible track 100. The player 120 then proceeds to manually move the toy car 110 through the desired course, mimicking the toy's 110 desired movement through turns and straights, and around or across obstacles 130. Depending on the type of game, the player 120 may decide to guide the car 110 slowly through a turn on the course to avoid it skidding off the track during a race, or guide the car 110 quickly across an obstacle 130 to allow it to achieve a high jump when racing. Once the guiding process is completed, recording stops.

During recording, sensor data indicative of the toy's motion may be received by receiver circuitry onboard the toy. This data may, for example, include sensor signals from the toy's onboard accelerometers, rate gyros, and magnetometer as well as wireless signals received from wireless transmitters 140 or other objects, such as a wireless remote control 150 in the toy's vicinity. The desired start and end of recording are detected by monitoring a button mounted on the toy that allows for user input.

An invisible track may then be created onboard or offboard the mobile robot. It may be created by processing the recorded sensor data to extract position information indicative of the toy's motions from the moment of detecting the desired start of recording to the moment of the desired end of recording; by fitting the position information to predefined invisible track segments; and by assembling the track segments to form a substantially continuous curve in space, typically using the processing circuitry. This continuous curve defining the invisible track can then be used in much the same way as a traditional physical track can be used. Unlike a physical track, however, its usable form typically exists in an electronic form (e.g., stored in computer memory), is separate from its real-world location (determined e.g., based on a coordinate system defined relative to a real-world object), and is not visible to the human eye.

Position information is information related to a position of an object. It may be determined in dependence of a position signal or in dependence of a sensor signal. It may be processed or unprocessed. It may comprise data from multiple sensors of different types. It may include information on a two (2D) or three-dimensional (3D) position. It may include orientation in addition to position (i.e., a 6D position). It may include other information at multiple points in time (e.g., as detected by multiple sensors both onboard and offboard the mobile robot). In some embodiments it may include more comprehensive data on the state of the mobile robot (e.g., a state estimate, which may e.g. comprise information on the robot's velocity). Depending on the type of sensors and the interactive mobile robot system's architecture, such position information may not be available directly but may need to be derived from related information. For example, if an odometric positioning system is used, the mobile robot's position information might be estimated by integration of velocity measurements over time.

The robot's current position may be determined from position information. In some embodiments it may be a position estimate or a state estimate. It may comprise 2D position, 3D position, or 6D position (i.e., 3D position+ orientation).

The position information is recorded relative to a coordinate system 104, which links the position of the invisible track 100 to the position of the toy's path in the real world. In some embodiments multiple different coordinate systems may be used and position information converted between them as convenient. The coordinate system 104 may be defined in many ways. For example, it may be defined relative to objects, such as toys 110, players 120, obstacles 130, anchors 140, controllers 150, or others, and based on a player action, such as the positioning of a toy car 110 at the start of the recording. It may also be defined by the positions of one or more markers (e.g., a start line to be placed at the beginning of the track and detected by a sensor), or by the position of a landmark detected by the interactive mobile robot system at a certain point in time, e.g. when the car's wheels touch the ground. In some embodiments, it may be desirable to include external signals, such as the vector of gravity or the direction of the Earth's magnetic field, to define the coordinate system 104. The coordinate system's definition and position are important, because they affect the location of the invisible track in the real world. For example, if the coordinate system was defined by the position of a marker, then laterally moving the marker by a given distance would laterally shift the location of the entire real world path representative of the invisible track by that same distance.

In some embodiments the main properties defined by a coordinate system are its position in space, its orientation, and its scale. In addition, other properties may be defined in some embodiments. For example, in certain embodiments it may be desirable to have the coordinate system change some or all of its properties over time or subject to game or other conditions or events.

Once the invisible track 100 has been successfully created relative to a suitable coordinate system 104, the player 120 again places the toy close to the starting location 102. The car 110 can now use the invisible track 100 to autonomously follow the track recorded by the player 120, moving through turns and straights, and around and across obstacles 130.

This may be achieved by using e.g., an input unit and an evaluation unit both part of the processing circuitry to monitor the sensor data indicative of the toy's desired movement received by the receiver circuitry to estimate the toy's current position relative to the coordinate system 104; by using e.g., an evaluation unit part of the processing circuitry to compare it to the desired position and/or movement according to the invisible track 100; and by using e.g., a control unit part of the processing circuitry to generate control signals based on their difference in space and/or time to control the movement of the toy 110 using the processing circuitry. The invisible track 100 may therefore be used to define an ideal trajectory through an obstacle course that a toy 110 should follow as closely as possible. However, it may also be used as a guideline and used in conjunction with other systems accounting for a toy car's 110 movements during all or part of its use (e.g., during a stunt jump over an obstacle 130). The user may also use the track to interactively (semi-autonomously) control the car by partially delegating tasks such as control tasks to the interactive mobile robot system. For example, a user may delegate the toy car's steering to a control system and only retain control of setting the toy car's desired speed around the course. This may be achieved by e.g., comparing the toy car's current position to that of the closest point of the invisible track, by computing the minimum distance between the two positions, and by generating control signals for the toy car's steering actuators such that they keep the toy car on the track as long as the player maintains an adequate speed. As another example, the interactive mobile robot system may also be arranged to help the player by e.g., automatically breaking their car before a sharp turn if their speed is too high.

A player may then decide to alter the track, adding additional obstacles, jumps, tunnels or bridges to the track as desired to have their car achieve a particular maneuver or to see how the car reacts to such changes. A player may also decide to compete against a second player and their car (none shown), with both cars using the same invisible track (e.g., to allow both players to compete on equal footing), or with the second player recording their own invisible track (e.g., if players think that they can guide their respective car more skillfully and create a superior invisible track to their opponent's).

Figure 2:
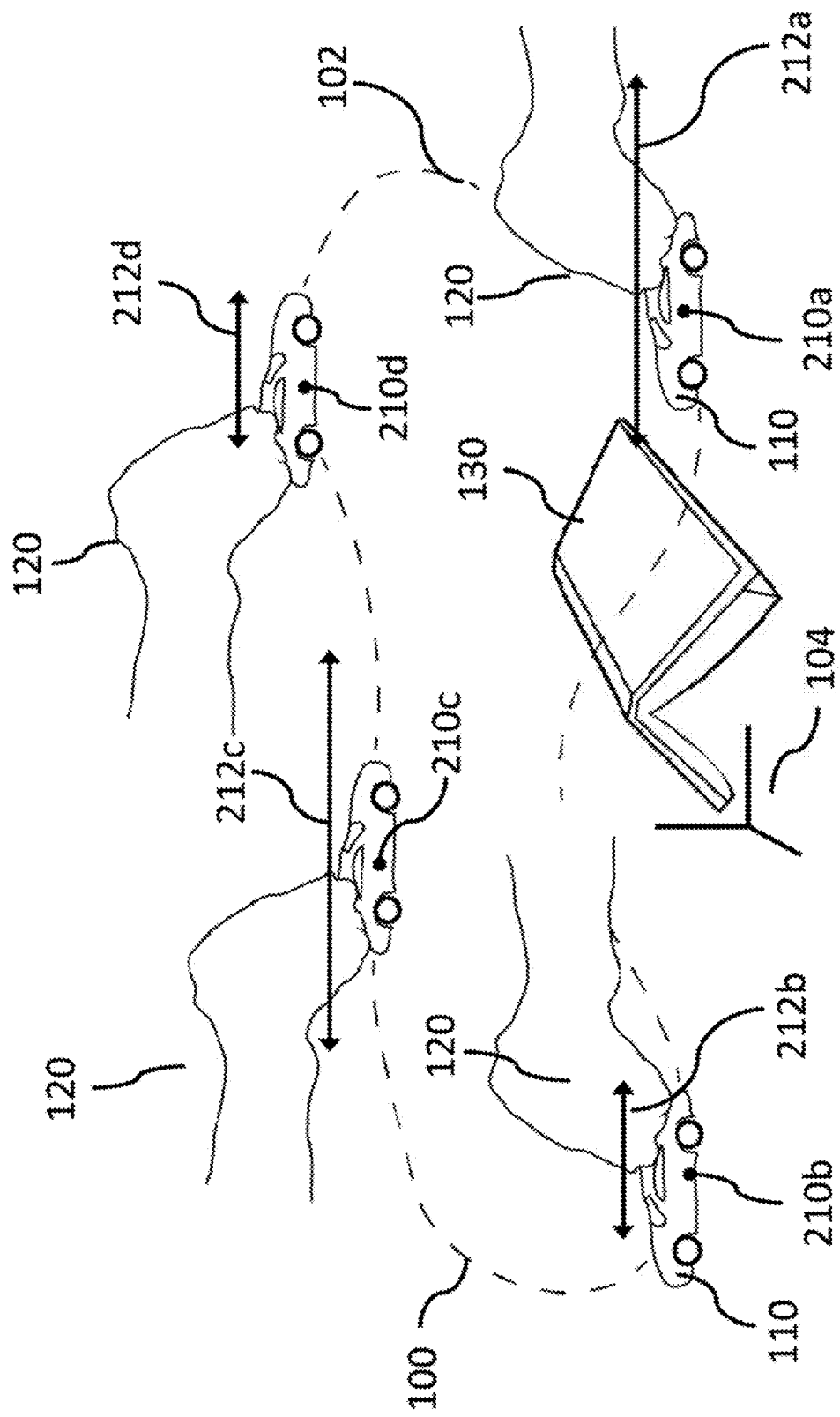
FIG. 2 shows an example of the player defining waypoints for a desired invisible track and is used to explain an aspect of the present disclosure from a player perspective.

FIG. 2 shows an embodiment of exemplary actions of creating an invisible track 100 as experienced by a player 120. Instead of continuously moving the toy along the track, the player 120 is seen recording a desired invisible track 100 by specifying multiple waypoints 210. To specify a waypoint 210, the player 120 may place a toy 110 at a position on the desired invisible track 100. In the example shown here, the player moves the toy 110 in the direction they desire for their track 100. In addition, the player 120 here moves the toy 110 in a back-and-forth motion 212 to indicate a desired velocity at each waypoint 210. For example, the player may specify fast velocities before a desired jump over an obstacle 130 or before a straight section of a desired track 100 by moving the toy 100 in a long back-and-forth motion 212a, 212c at the corresponding waypoints 210a, 210c, and a player may specify slow velocities at waypoints before turns 210b, 210d by performing a short back-and-forth motion 212b, 212d.

The desired start (and end) of recording may be detected by monitoring a button mounted on the toy and by recording subsequent motion through space relative to a coordinate system. Alternatively, desired start (and end) of recording can also be determined based on sensor signals received by the receiving circuitry and processed using processing circuitry. For example, a distance sensor mounted on the bottom of the car may be used to start recording of a new waypoint as soon as the car is put on the ground and stop recording waypoint information for that waypoint once the car is lifted up from the ground.

In this example embodiment, the desired velocity may be determined by using sensors to record the toy's wheel motions, converting these motions to distances using the car's known geometry (i.e., by using odometry), and then mapping small and large distances to small and large desired speeds or velocities on the invisible track, respectively. The desired velocity can, for example, also be obtained by integrating acceleration information from accelerometers onboard the toy to obtain an estimate of the toy's speed as it is moved by the user, and by averaging this speed over the time from the start to the end of recording of each of the waypoints.

Note that the exemplary embodiment in FIG. 2 does not use positioning anchors 140 or other offboard sensors. Instead, the toy's motion is tracked using a combination of onboard sensors to detect data. Such relative data may, for example, include sensor signals from accelerometers, rate gyros, and wheel encoders that are integrated from the start of recording of the invisible track. This sensor data recorded relative to the desired start location may be augmented by data that may, for example, include sensor signals from an onboard vision or camera system observing the toy's environment including fixed obstacles 130, patterns on the ground, or the Earth's magnetic field. Other exemplary ways to determine position information or the mobile robot's current position in the present disclosure include sensor signals from a Global Navigation Satellite System (GNSS, e.g. the global positioning system (GPS)), from an external camera tracking system, from a motion tracking system, or from navigation techniques such as simultaneous localization and mapping (SLAM). In this example, the coordinate system 104 may be determined based on a fixed object 130 detected while defining a track waypoint 210a.

Although not shown, multiple toys 110 or multiple remote controls 150 may be used with a single invisible track 100.

Although both embodiments described above explain the present disclosure with respect to a robot toy, it will be apparent to a person skilled in the art that the above and the remainder of this disclosure is equally applicable to other mobile robots. Mobile robots are robots that have the capability to move around in their environment and are not fixed to one physical location. While many mobile robots have applications in domestic services or industry, some mobile robots are not made for utilitarian purposes. With the increasing commoditization of embedded sensors and processors, these robots (sometimes called "robot toys", "toy robots", or "entertainment robots") are increasingly used for entertainment. Recently, wheeled and flying mobile robots in particular have increased in popularity and are now often sold as toys.

Figure 3:
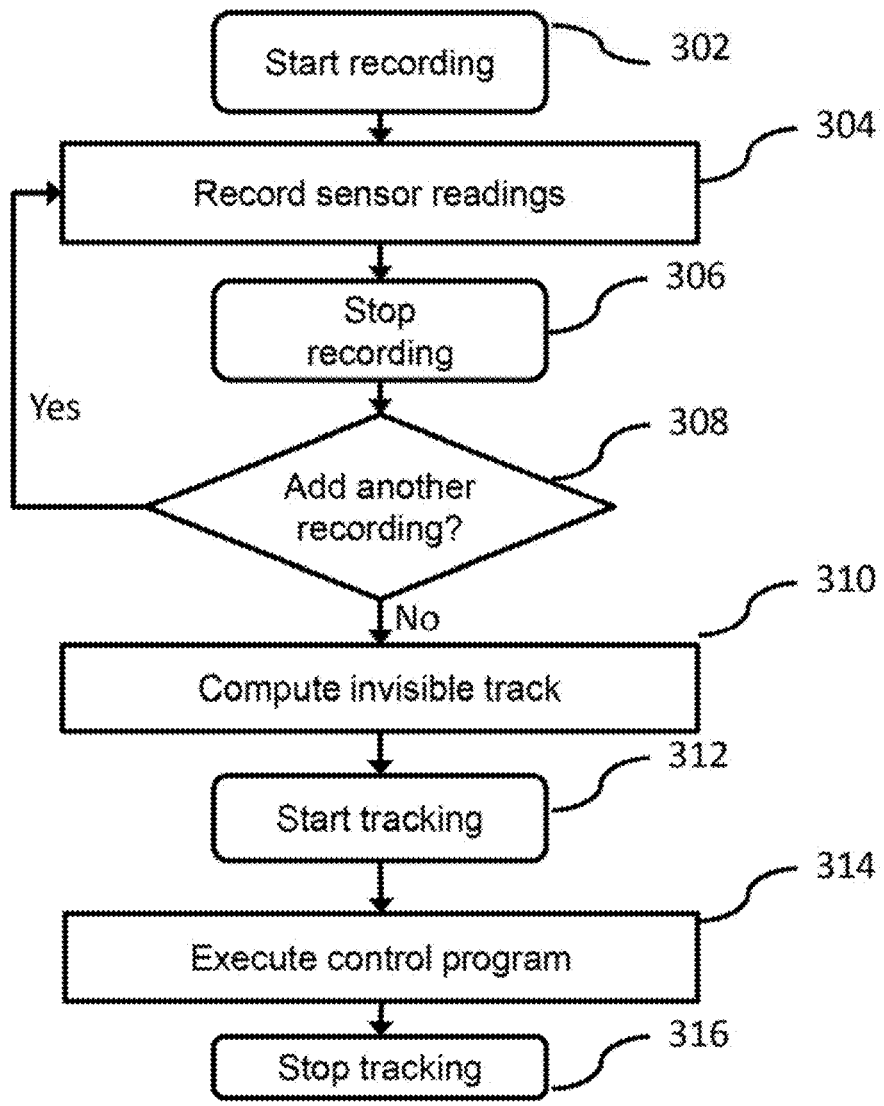
FIG. 3 shows an overview flowchart for explaining a way of creating and using an invisible track.

FIG. 3 shows a flowchart of a process to create an invisible track. Once a user 120 starts the recording process 302 (e.g., by pressing a button or by tapping a toy or by activating a mobile robot 110), sensor data representative of the motion as the mobile robot 110 is moved along the desired track 100 or to specific waypoints 210 is recorded 304 until recording is stopped 306 (e.g., by pressing a button or by returning the mobile robot 110 close to the start location 102). In some embodiments, multiple recordings 308 may be required and requested from a user 120. Accordingly, a user 120 may be instructed to continue guiding the mobile robot 110 through all or parts of the course until sufficient data has been recorded, or until another criterion, such as an error or convergence criterion, is met. Such creation of an ensemble of recordings may be particularly useful for complex tracks, for eliminating ambiguities in sensor readings, or to reduce high variability in the recorded data. In some embodiments such multiple repetitions may also be used to better define certain aspects of the track (e.g., attributes, properties). Once a sufficient amount of data has been recorded (e.g., based on a metric like way point density), an invisible track may be computed using processing circuitry and stored 310, e.g. in a memory unit.

The recording process may also be used to record a second invisible track to be merged with the first invisible track and to be, e.g., used as a second lane. This may, for example, be achieved by duplicating a track, by shifting the duplicated track's position with respect to the initial track, or by resizing duplicated track. The two tracks may be connected at one or more points. Such double tracks may, for example, be useful in a race where two similar, parallel invisible tracks may be desired.

To use an invisible track, a user may initiate tracking 312, for example by using a switch on the mobile robot. Once tracking has started 312, a control program may start monitoring 314 the relative position of the mobile robot to the invisible track. Tracking may be stopped 316 when a corresponding command is received from the user or when another condition, such as a low battery alert or a desired mobile robot state, is met.

In some embodiments it may be useful to extend or alter the exemplary actions of the flowchart shown in FIG. 3. For example, an additional calibration stage may be added that may include the actions "Start calibration", "Calibrate", and "Stop calibration". As part of this stage, a player may, for example, guide a toy along the side walls of the box used to stow the toy to provide sensor data related to the known dimensions of the box for the purpose of sensor calibration.

In some embodiments it may be useful to replace the exemplary actions of the flowchart in FIG. 3 with other operations. For example, actions 302 to 310 may be replaced by a single action "Load existing invisible track from memory", which may load an invisible track previously created by a player or downloaded from the Internet from a memory unit.

In some embodiments it may be useful to replace or add other user actions to the exemplary actions of the flowchart in FIG. 3 to trigger specific processes, events, or actions like those described above or below, and in particular those in the following Tables 1 to 5. Such actions may, for example, be performed using one or more toys and mobile robots 110, controllers 150, anchors 140, or objects (e.g., obstacles or mobile computing devices). They may be detected using sensors. For example, a user 120 may position objects at a specific location (e.g., they may place their toy 110 next to another user's mobile robot or next to a controller 150, or they may positioning anchors 140 in a certain configuration, or position gates along a desired invisible track 100 to act as markers); move objects both, independently or with respect to other objects (e.g., they may move a toy 110 back and forth along a desired track 100, or they may move a controller 150); press a button or activate a switch (e.g., they may press a button on a toy car 110 to register a desired waypoint 210, or they may use a switch to activate a race mode); use a PC, tablet, smartphone, or similar digital device (e.g., they may use a smartphone to remotely control actions of a toy, or they may edit a graphic representation of a recorded invisible track 100); draw lines or patterns (e.g., they may use a marker pen to draw a line for a toy 110 to follow, or they may draw a pattern for a toy 110 to react to); or select a rule (e.g., they may select a wall-following rule, which causes a toy 110 to automatically follow a wall when detected by its sensors).

Tables 1-6 below summarize exemplary actions of the user or of the system that may occur in various embodiments of the present disclosure.

TABLE 1

| | Exemplary actions |
|---|---|
| 1 | Switch on a mobile robot 110 |
| 2 | Receive an indication that the interactive mobile robot system is operational |
| 3 | Move the mobile robot 110 to a first position of a desired invisible track 100 |
| 4 | Provide an indication that the first position on the desired invisible track 100 has been reached |
| 5 | Move the mobile robot 110 to a second position on the desired invisible track 100 |
| 6 | Provide an indication that the second position has been reached |
| 7 | Provide an indication that the recording of the desired invisible track is complete |
| 8 | Provide an indication to execute a control program |
| 9 | Switch off the mobile robot 110 |

In Table 1, the indication that the interactive mobile robot system is operational may be triggered automatically, for example by performing automatic self-checks of the mobile robot system's components, or by the user, for example via a "start" button. The user may then manually move the mobile robot from one position to the next until the desired number of positions has been recorded. The indication that the next position has been reached may again be triggered automatically or by the user pressing a button.

Table 2 lists exemplary actions that may be used for embodiments that use powered positioning anchors 140 and/or a controller 150:

TABLE 2

| | Exemplary actions |
|---|---|
| 1 | Switch on the controller 150 |
| 2 | Switch on the first anchor 140a |
| 3 | Switch on the second anchor 140b |
| 4 | Position the first anchor 140a in the vicinity of the play area |
| 5 | Position the second anchor 140b in the vicinity of the play area |
| 6 | Switch off the first anchor 140a |
| 7 | Switch off the second anchor 140b |
| 8 | Switch off the controller 150 |

In Table 2, the user may perform switching and positioning actions manually. However, the above actions may be combined with automatic system checks that provide an indication that the interactive mobile robot system, including the remote control 150 and anchors 140, is operational.

Table 3 summarizes exemplary actions by the interactive mobile robot system:

TABLE 3

| | Exemplary actions |
|---|---|
| 1 | Receive an indication that the mobile robot 110 has been switched on |
| 2 | Provide an indication that the interactive mobile robot system is operational |
| 3 | Receive an indication to start the recording of an invisible track 100 |
| 4 | Record data related to the motion of the mobile robot 110 from a first sensor |
| 5 | Record data related to the motion of the mobile robot 110 from a second sensor |

TABLE 3-continued

| Exemplary actions |
|---|
| 6 Receive an indication to stop the recording |
| 7 Compute an invisible track 100 |
| 8 Provide an indication to execute the control program |
| 9 Execute a control program |
| 10 Receive an indication to stop executing a control program |

Table 4 lists further exemplary actions that may be used by the interactive mobile robot system, for example if powered anchors 140 or a remote control 150 are used:

TABLE 4

| Exemplary actions |
|---|
| 1 Receive an indication that a first anchor 140a has been switched on |
| 2 Receive an indication that a second anchor 140b has been switched on |
| 3 Receive an indication that a remote control 150 has been switched on |
| 4 Time-stamp data recorded by the first sensor |
| 5 Time-stamp data recorded by the second sensor |
| 6 Compute a current position of the toy 110 |

Relative distances between anchors may be determined using various methods, including for example optical, radio, or acoustic methods well known in the prior art. Relative positions may be computed using trilateration, triangulation, multilateration, or multiangulation. Time of arrival and time difference of arrival techniques may be used.

According to one aspect of the present invention, the following exemplary actions may be used in some embodiments:

TABLE 5

| Exemplary actions |
|---|
| 1 Defining a coordinate system 104 |
| 2 Moving an object to locations for the desired invisible track 100 |
| 3 Recording sensor information related to the motion of the object in the coordinate system 104 |
| 4 Processing the sensor information to create a digital representation of the invisible track 100 |
| 5 Triggering at least one event based on the relative current position of the mobile robot to the invisible track 100 |

As will be apparent to one skilled in the art, the exemplary actions listed above and below and in Tables 1 to 5 in particular may be usefully employed with certain embodiments of the present invention in a different order than shown above. Moreover, in some embodiments some of the above actions may be duplicated or omitted, or additional actions added, and some, none, or all of the above actions may be used.

Figure 4:
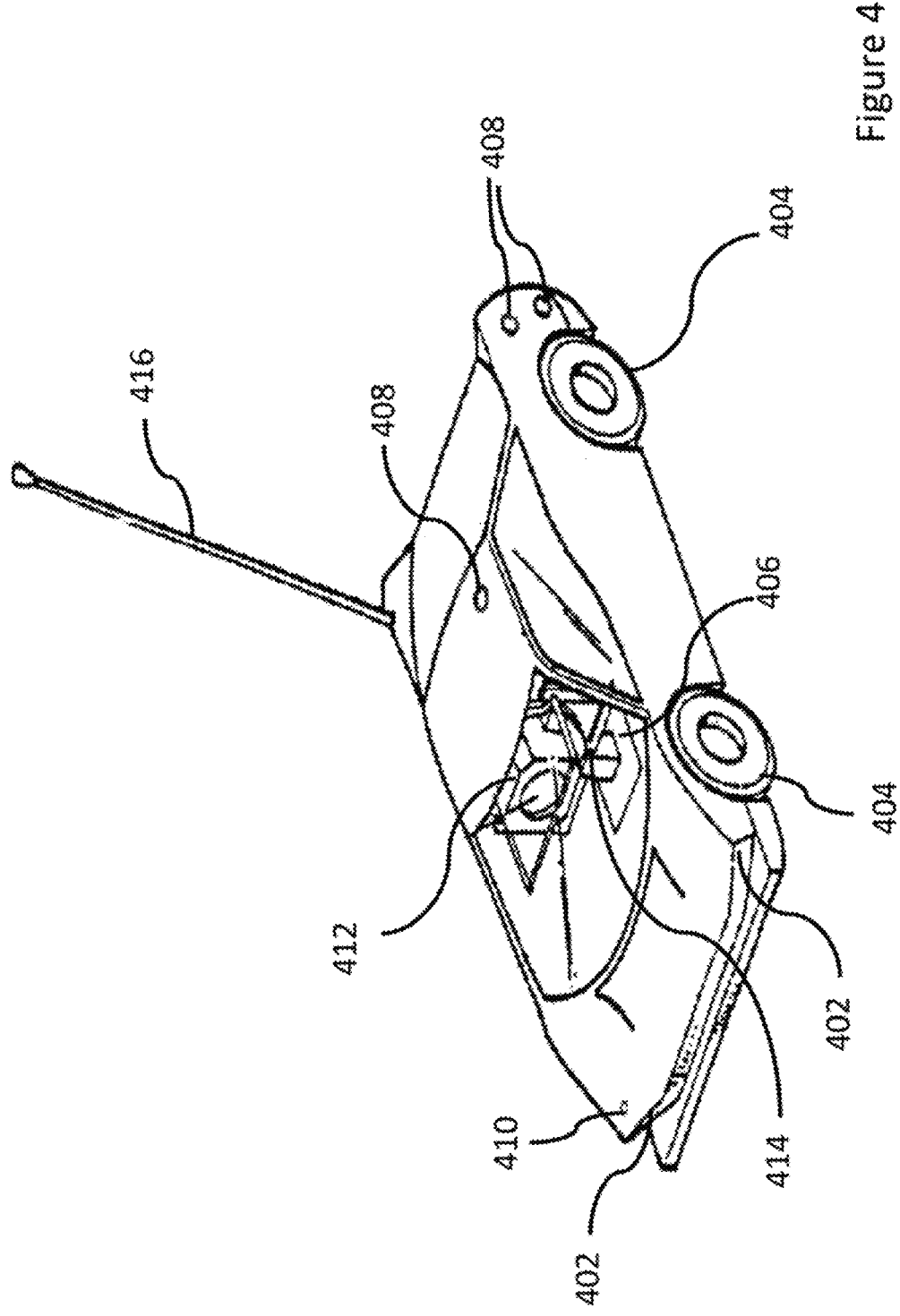
FIG. 4 shows a detailed view of an embodiment of a mobile robot that may be used with an invisible track, including its sensors, actuators, communications, and elements for user interactions.

FIG. 4 shows a detailed view of an embodiment of a mobile robot 110 that may be used with certain embodiments of the present disclosure. The mobile robot 110 in FIG. 4 is prepared and adapted for manual guiding by a user by being designed to have a suitable size, weight, and shape to be easily manipulated; by covering electrically sensitive or potentially dangerous parts including its circuitry and batteries to avoid direct contact with a player's hand; by making the toy's actuators safe to be touched; and by equipping it with elements (e.g., sensors, buttons, switches) suitable for user interaction. Some embodiments may be further adapted by selecting sensors and their placement such that disturbance to their operation by user manipulation is minimized or sensor placement and use of corresponding software to detect user manipulation. In FIG. 4, the robot's 110 elements may be broadly grouped into components such as sensors, actuators, circuitry, chassis, batteries, and others. Sensors 402 may be used both onboard and offboard the mobile robot 110 and allow, for example, to detect a mobile robot's movement and motion through space, the presence of obstacles, commands issued by a user 120, or provide feedback on the state of actuators 404. Actuators 404, such as motors that power a mobile robot's wheels, may be used to move a mobile robot along an invisible track 100. Various cabling and circuitry, often operationally connected to a control module 406 implemented on a microprocessor, may be used to receive, evaluate, process, save, or otherwise treat signals from sensors 402 and to send control commands to actuators 404. Typically, various elements, such as a user or player interface 408, are used to receive user input and provide user feedback. For example, buttons 408 may be used to allow a user to start and/or stop recording. Microphones may be used to allow a user to give voice commands. Other examples of how to receive user input include input devices such as a remote control (sometimes: remote controllers) as well as motion sensing and motion tracking input devices and mobile computing devices. User actions may also be detected by onboard or offboard sensors. For example, an accelerometer may detect a user hitting the table or an infrared sensor may detect the hand of a user blocking a toy's path, both of which may be used to provide user input. Lights 410 and sounds such as those from a speaker 412 may be used to provide feedback or give instructions to the user. In some embodiments, such lights 410 and sounds may be used for user interaction, to display the status of a mobile robot 110, or for effect. For example, a recording LED 410 may be used to indicate that a toy 110 is now in recording mode. Similarly, refinement, racing, or error LEDs may be used to provide user feedback in addition to the mobile robot's movement. The mobile robot 110 may be powered by a battery 414. Additional components, such as recording circuitry including an antenna 416 used to send and receive wireless signals as well as other communications interfaces, including both wired and wireless, may be used.

Figure 5:
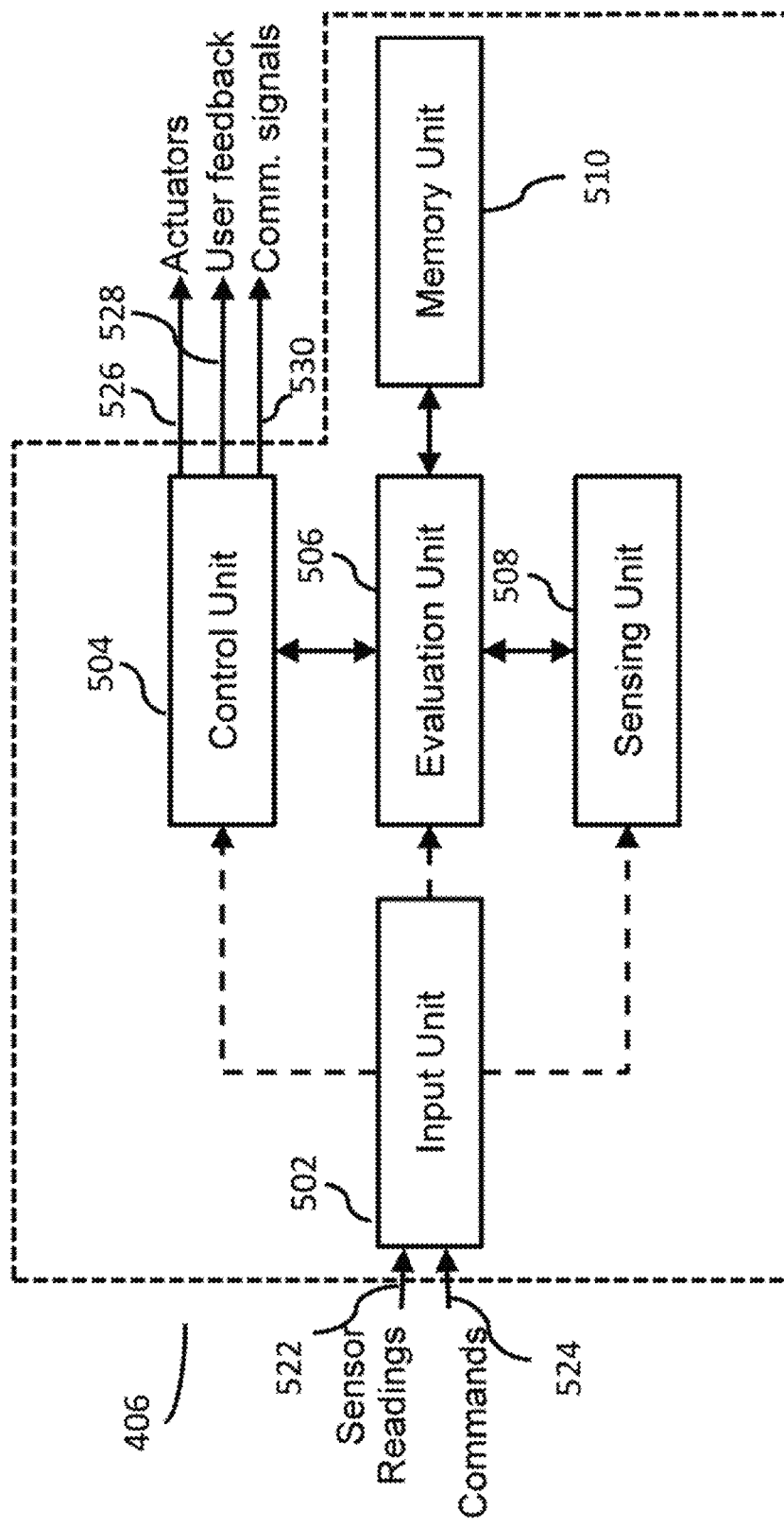
FIG. 5 shows a control module that may be used with certain embodiments of the present invention.

FIG. 5 shows an example of processing circuitry consisting of a control module 406 for a mobile robot 110 that may be used as part of certain embodiments of the present disclosure. Processing circuitry is typically implemented using micro-controllers or FPGAs and configured by programming. For mobile robots 110, such a control module 406 is typically implemented onboard or both onboard and offboard (e.g., with a control unit 504 directly connected with the onboard motors and receiving inputs via an input unit 502 from offboard sensors via an offboard sensing unit 508 such as a localization system). Control modules 406 are typically used to process mobile robot inputs (e.g., user commands, sensor readings) and to compute outputs (e.g., control signals for actuators 526).

Processing circuitry may be operationally connected to receiver circuitry. Receiver circuitry may receive data wirelessly from a remote location, typically using an antenna.

Control modules 406 may be used in various operating modes including remote control by a user 120 or in partial autonomous (also called "semi-autonomous" or "interactive") or fully autonomous modes of operation. For example, they may be used to allow a user 120 to fully control a mobile robot's speed and direction; or to control only the speed at which a mobile robot 110 moves along an invisible track 100; or they may be used to allow a mobile robot 110 to semi-autonomously avoid obstacles while a user 120 is controlling another aspect of a mobile robot's movement remotely. This may be achieved by using a control unit 504 to generate control outputs for a mobile robot's actuators 404 based on sensor information, position information, current position, and the invisible track. In some embodiments control modules 406 may be used to allow a mobile robot 110 to autonomously follow an invisible track 100 without user control input.

A mobile robot's sensors may be operationally connected to a sensing unit 508. A sensing unit 508 may be structured and arranged to detect data representative of the motion and movement of a mobile robot. It may provide data to the evaluation unit. In some embodiments the sensor 402 belongs to the group of inertial sensors, distance sensors, rate sensors, and ultra-wide-band (UWB) sensors. In some embodiments the sensor 402 providing sensor readings 522 belongs to the group of accelerometers, gyroscopes, magnetometers, cameras, optical sensors including optical flow sensors, laser or sonar range finders, radar, barometers, thermometers, hygrometers, bumpers, chemical sensors, electromagnetic sensors, air flow sensors or relative airspeed sensors, ultra sound sensors, microphones, radio sensors, or other height, distance, or range sensors, or infra-red sensors. In addition to onboard sensing, offboard sensors may be used.

Control modules 406 typically receive high-level inputs in the form of goals or commands from a user or from a base station. A base station may be a processing station (e.g., a computer), a remote control 150 (e.g., a handheld remote control 150 for manual user input or a more complex remote control 150 such as a laptop, smartphone, or tablet computer), or a command center (e.g., a control console). Control modules 406 may also receive inputs from other sources, e.g. from a high level control algorithm run locally (e.g., in a microcontroller on an anchor) or remotely (e.g., on an Internet server). Control modules 406 may receive inputs via an input unit 502. Data related to inputs may be passed on from the input unit to a control unit 504, evaluation unit 506, or sensing unit 508. Control units 504 are typically used to generate control signals for a mobile robot's actuators 526 and devices (e.g., LEDs, microphones). In addition, control units 504 may output feedback to a user 528 (e.g., user prompts, error messages, audio alerts). Moreover, control units 504 may output communication signals 530 to interface with other system components (e.g., anchors 140) or interface with more advanced onboard and offboard user interfaces (e.g., GUIs, laptops, remote controls 150). This is particularly useful when bi-directional wireless communication (rather than one-way or broadcast communication, e.g. only from anchors 140 to one or more multiple mobile robots 110) is used. Evaluation units 506 are typically used to evaluate data from input units 502, sensing units 508, or memory units 510. Such data may be representative of user commands or high-level commands. It may include position information or current position of the mobile robot or of anchors 140. It may include wheel or visual odometry/SLAM, retro-reflective positioning systems, laser range finders, Wi-Fi positioning systems, barometric altimeters and variometers, or ultra-sound sensors. Sensor data may be gathered and preprocessed using a sensing unit 508. It may be stored in a memory unit 510. Memory units 510 are typically used to store data for further processing or later analysis or use. For example, they may be used to store data on past sensor readings, operational states, or user commands, as well as properties of a mobile robot 110 or data related to invisible tracks 100.

Depending on the embodiment, all of the above units may be implemented on a single circuit board, on a single board computer, on a single microcontroller, or in a distributed fashion. Depending on the application, control modules 406 may be far more complex than the simple block diagram shown in FIG. 5 and may, in particular, comprise multiple input units 502, control units 504, evaluation units 506, sensing units 508, and memory units 510 arranged in a single block or multiple blocks.

In some embodiments, the control module shown in FIG. 5 may be used when performing the exemplary actions outlined in Tables 1 to 5, and in particular those of Tables 3 and 4.

In some embodiments a control module 406 may be used to detect various mobile robot states. For example, a collision state may be detected using sensor data. This may, for example, be achieved by comparing actual sensor data received by a sensing unit to expected sensor data in an evaluation unit. A control unit may then be used to improve the mobile robot's reaction to the detected mobile robot state. For example, a mobile robot's control unit may not command a reduction in speed if a loss of traction detected by a sensing unit coincides with the detection of a collision state. As another example, detected collision events may be used to improve the accuracy of a computed invisible track, or stored as attributes for later use. Other states that may be detected and used as part of the present disclosure include a weightless state, which may correspond to a jump following an obstacle; a lift-up state, which may correspond to a user lifting up the mobile robot; a wall-slide, which may correspond to a period of driving in contact against a wall; and others.

In some embodiments control modules may be used to implement a centralized, master-slave or server-client architecture. In a first example embodiment, a mobile robot may determine position information and current position based on anchor signals; may be used to create an invisible track based on the position information and the current position; may implement a control strategy for navigating using an invisible track; and, if applicable, may transmit and receive the positioning information and the current position from other toys. In a second example embodiment, an anchor may determine position information and current position based on signals from one or more mobile robots; may be used to create one or more invisible tracks based on the position information and the current position; may implement and transmit one or more control strategies for navigating using an invisible track; and, if applicable, may transmit and receive the positioning information and the current position from other mobile robots. In some embodiments control modules 406 may be used to implement a de-centralized, distributed, or peer-to-peer architecture. For example, a first and second mobile robot 110 may each determine position information and current position based on anchor 140 signals; may be used to create invisible tracks 100 based on the position information and the current position; may implement control strategies for navigating using an invisible tracks 100; and, if applicable, may transmit and receive the positioning information and the current position from other mobile robots 110 independently.

It will be apparent to one skilled in the art that many system architectures known in the prior art may be combined and used with the present disclosure, and may result in, or be selected for, their desirable properties depending on the specific application at hand.

Moreover, it will be apparent to one skilled in the art that system architectures are not restricted to single aspects of the present disclosure, such as the computational architecture or the communications architecture, but may encompass all aspects of the present disclosure. For example, various system architectures for user interaction known in the prior art may be combined and used with the present disclosure to define or improve the distribution of user interaction elements like buttons, switches, and lights used for the recording, processing, creation, refining, or use of invisible tracks among the various parts of the interactive mobile robot system. As another example, various system architectures for data processing known in the prior art may be combined with the present disclosure to optimize data processing among the various elements of the interactive mobile robot system, including onsite and offsite elements such as cloud services (e.g., sending data to a cloud-based web service for processing), or including commonly available elements (e.g., mobile computing devices).

FIGS. 6A to 6G show example mathematical and graphic representations of various invisible tracks 100 along with their real-world equivalents in a perspective view.

Figure 6:
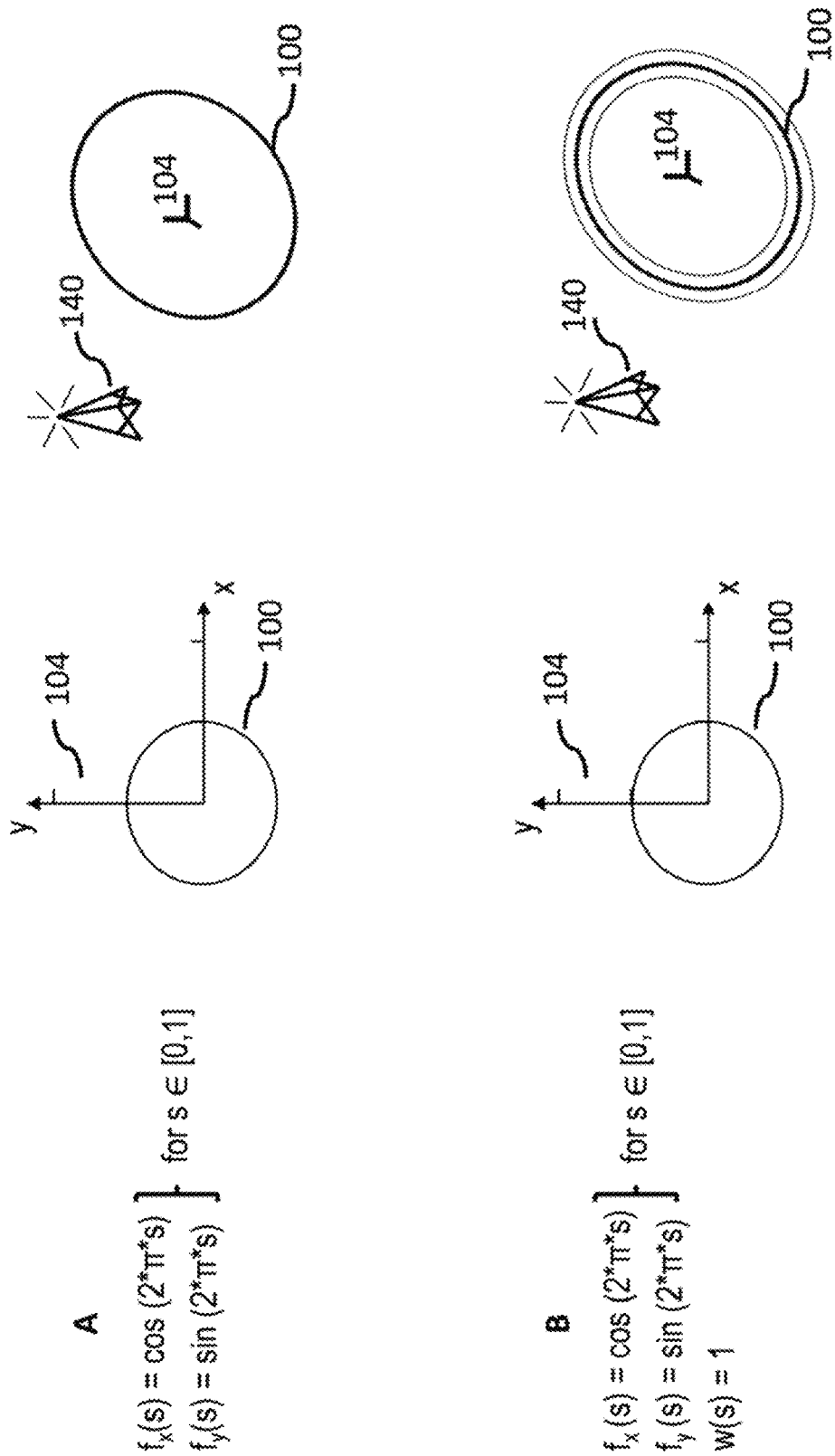
FIGS. 6A to 6H show ways of representing invisible tracks.
Figure 6:
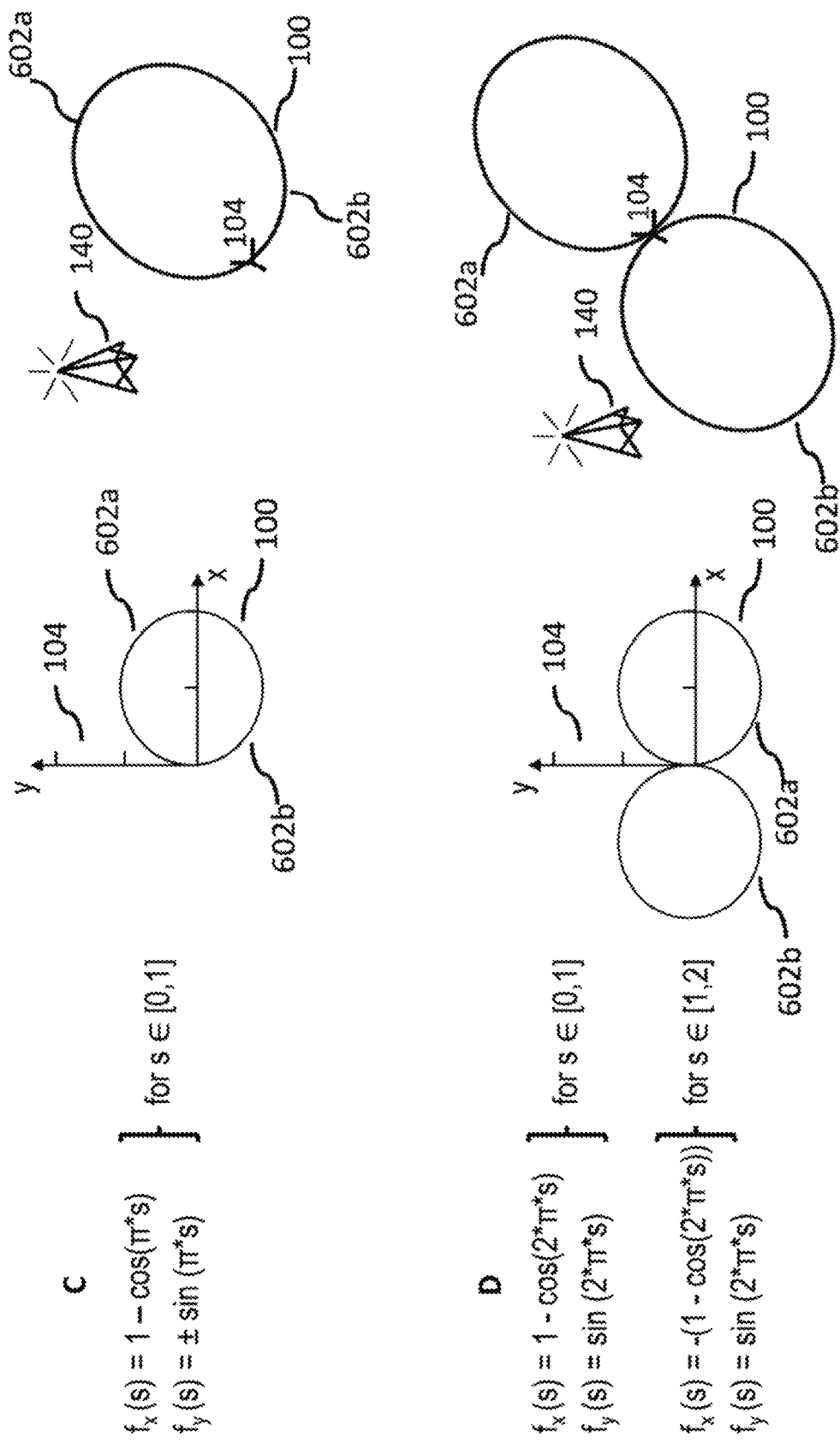

FIG. 6A shows a circular invisible track 100 represented as a parametric function of the continuous parameter s, which can take any value in the interval [0,1]. In this embodiment, an invisible track is anchored in the real world using a coordinate system 104, here defined relative to an anchor 140.

FIG. 6B shows the same circular invisible track 100 represented as a function of the continuous parameter s with an additional attribute w that defines the width of the invisible track. In the example shown, the width w is used to extend an invisible track 100 into a racing track that may be used with a toy by creating a two dimensional surface in the xy plane of the coordinate system 104. Many other attributes, such as those delineating safe margins for a desired invisible track (e.g., the maximum width) or attributes related to using the track (e.g., the minimum or maximum speed along the track) may be used.

FIG. 6C shows an invisible track 100 consisting of two invisible track segments 602 represented as a parametric function of the continuous parameter s, which can take any value in the interval [0,1]. Note how associating the continuous parameter s with time results in both branches 602*a* and 602*b* progressing in parallel. This representation is one of many that may be used to define a fork in an invisible track 100. In this example, an invisible track forks into two separate routes at s=0, and both routes merge again at s=1.

FIG. 6D again shows an invisible track 100 consisting of two invisible track segments 602. Unlike in FIG. 6C, where both segments are represented in parallel, the two segments here are represented as functions of the continuous parameters s, with the first segment defined as s chosen from the interval [0,1], and the second segment defined as s chosen from the interval [1,2]. In this example, the two invisible track segments 602 are connected by having a shared point at s=1. Note how associating the continuous parameter s with time may be used to move a mobile robot 110 in a figure eight pattern along the track 100 by starting from a starting point at s=0 and moving towards an end point at s=2.

Invisible track segments 602 may be created and used in much the same ways invisible tracks 100 may be created and used. For example, in some embodiments an invisible track segment may be created by moving an object along a desired invisible track segment and recording sensor data related to the motion of the object. This may, for example, be achieved by moving an object such as a toy 110, anchor 140, controller 150, or sensor along the entire invisible track segment 602. In some embodiments the object is moved or guided manually. In some embodiments a remote controlled mobile robot 110 may be remotely controlled along a desired invisible track segment by a user 120. An invisible track segment may then be created from the sensor data recorded during the mobile robot's movements and motions. In some embodiments an invisible track segment 602 may be created by moving an object to waypoints related to an invisible track segment. For example, waypoints may be used to mark the position of the end and the beginning of an invisible track segment. As another example, waypoints may also mark a desired orientation, a desired speed, or a desired width of an invisible track or invisible track segment.

In some embodiments an invisible track segment may be created from sensor data recorded during rule-based, autonomous or semi-autonomous exploration. For example, the desired segment is marked by a user by drawing a line, using colored tape, by assembling a track area from paper cut-outs, or by blocking a mobile robot's path using obstacles. In some embodiments invisible track segments may be drawn using a PC, tablet, smartphone, or another digital device; may be downloaded from a storage medium or from the Internet; or may be shared by another player. In some embodiments invisible track segments may be created based on environmental features. For example, segments may be created based on a rule to follow the edge of a table, to follow a wall, or to react to a floor pattern.

In some embodiments such a rule may be a user-programmed rule (e.g., 4 cm forward, 90 deg right turn, etc.). Examples for possible rules include a chase cam car rule, with an invisible track segment defined as a relative offset in time or space from an ongoing or previously recorded movement or motion of another object. For example, an invisible track segment may be created based on a previously recorded invisible track segment such that a mobile robot equipped with a camera following the newly created invisible track segment will film the original mobile robot as it follows the originally recorded invisible track segment a second time. As another example, an invisible track may be created that is parallel to an existing invisible track, allowing two players to race on a substantially similar track while decreasing the risk of collisions between their toys. As yet another example, a player may race against themselves by first recording an invisible track segment, and then using that invisible track segment to have a computer-controlled opponent duplicate their previous performance by matching its driving maneuvers to those recorded.

When creating invisible track segments, it may be useful to also create their directionality. For example, the track segment shown in FIG. 6A may have its start point at the top (position (0,1) in the coordinate system), and its end point at the right (position (1,0) in the coordinate system). This may be achieved by associating the invisible track segment with corresponding attributes. In some embodiments an invisible track segment's directionality may also be created using a continuous parameter. For example, for parameterization of the track segment shown in FIG. 6A results in a counter-clockwise rotation. In some embodiments an invisible track segment's directionality may be created using time. For example, the segment's start point may be automatically set to the point that was recorded first when creating an invisible track, and the segment's end point may be automatically set to the point that was recorded last.

As will be apparent to one skilled in the art, many of the exemplary ways of creating and using invisible track segments and invisible tracks listed above and below may be usefully applied to creating and using both invisible tracks and invisible track segments. Moreover, the ways of creating and using invisible track segments and invisible tracks may be usefully employed with certain embodiments of the present disclosure in a different order than shown, and some of the ways may be duplicated or omitted, or additional ways added, and some, none, or all of the ways may be used. In some embodiments, invisible tracks and invisible track segments may be created using other ways, including the various player actions described above and below.

FIG. 6E shows another, different invisible track 100 consisting of two invisible track segments 602.

FIG. 6F shows a three dimensional invisible track 100 again represented as a function of a continuous parameter s. The invisible track's representation also includes two attributes. First, a boost pad positioned at s=0.5, and second a desired target speed of 2 m/s positioned at s=0.7 along an invisible track. These additional invisible track elements may be used to define operating parameters for a mobile robot or as part of the game play of a robot toy. For example, a boost pad may automatically and temporarily increase a toy's speed when passing in its vicinity, or a target speed attribute may be defined by a player 120 and used by a toy car's control module to better perform a jump over an obstacle 130. Other examples include a desired sequence or timing and a desired target time for an invisible track's waypoint.

Attributes are additional data comprised in an invisible track. They may be used to store related actions, such as a desired state or event. For example, attributes may be used in game play by comparing a game state (e.g., the position of a robot toy 110 or the time elapsed since the start of recording) to the attribute. If the state corresponds to that defined by the attribute, an action associated with the attribute may be executed. Such an action may be stored alongside the attribute as part of the invisible track 100, or a link to a corresponding action may be stored, with the action stored separately, for example as an entry in an action table.

For the example in FIG. 6F, the state may be the parameter s being equal to the value 0.5, and the action may be to increase the mobile robot's speed. In a toy application, the attribute may for example be used in game play by using an evaluation unit to monitor the value of s, and once a value of substantially s=0.5 (e.g., as defined by a threshold or margin of error) is detected, sending data from the evaluation unit and increasing the toy's speed by using a control unit to compute and send control signals to the toy's actuators 404.

FIG. 6G shows a representation of an invisible track 100, with space partitioned into a two dimensional grid and an invisible track 100 represented as a table that stores grid points belonging to the track. Many, more complex forms of this type of representation are possible, including those commonly used to store pixels or voxels. In this example, attributes for specific grid points are stored in the same table.

FIG. 6H shows a representation of an invisible track 100, with individual points belonging to the track stored in a table. Attributes can then be stored as part of the same table or in a separate table.

As will be apparent to one skilled in the art, while most examples above are shown in two dimensions, all of the representations in the present disclosure can equally be used and extended to three, four (including time), six (including e.g., positions and orientations), or more dimensions. In addition, many other ways of representing spatial data known in the prior art, including those used to represent manifolds and topological spaces like paths, courses, trajectories, curves, surfaces, or volumes, may be used to represent invisible tracks 100 and invisible track segments 602.

As will also be apparent to one skilled in the art, while only a few, exemplary attributes are shown in FIGS. 6A to 6H, a large number of other attributes may be desired, and may be represented, for invisible tracks 100 and invisible track segments 602. Examples, some of which are illustrated in more detail above or below, include track points with particular topological relevance such as track forks or track merging points, sections where a mobile robot 110 does not need to follow the track but may be freely steered by a user, maximum speed or other traffic rules, simulated changes in the friction of the track, or other special sections.

FIGS. 7A to 7N show various examples of invisible track segments 602, including single segments (FIGS. 7A to 7H) as well as combinations of two segments (FIGS. 7I to 7N) that may be used in some embodiments.

Figure 7:
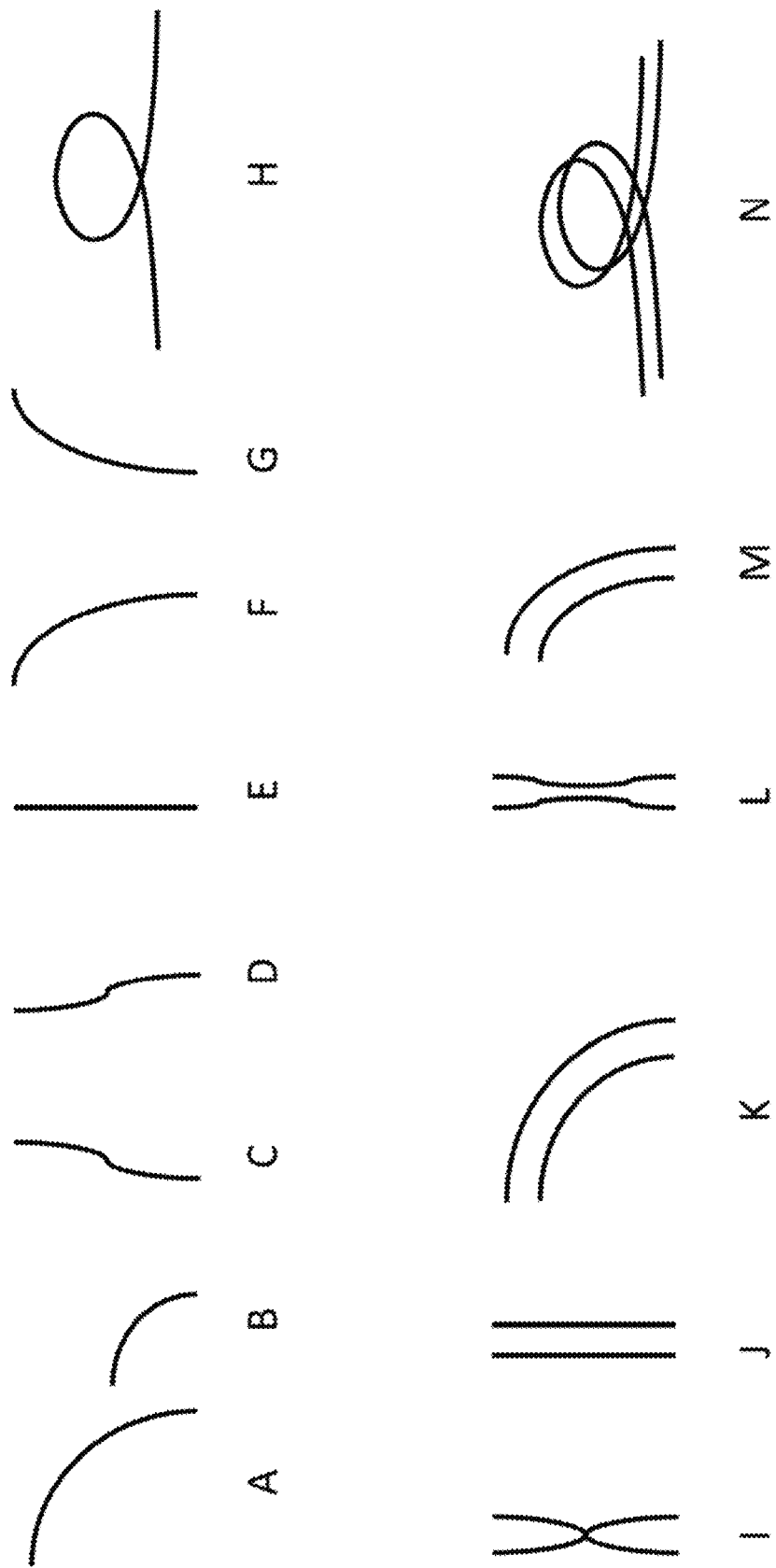
FIGS. 7A to 7N show various examples of invisible track segments.

Many types of invisible tracks 100 may be composed from the invisible track segments 602 shown in FIG. 7. These include closed tracks (i.e., tracks that form a loop such that their start point is identical to their end point) and open tracks (i.e., tracks that run from a start point to an end point different from the start point); forks and/or merging points; dead ends; bridges; tunnels; and crossings. In some embodiments such track segments may be used to create invisible tracks with multiple lanes. For example, they may be used to recreate track topologies found in popular slot car racing games. They may also include features typical of real-world toy tracks (e.g., pit lanes, parking spots, loops) and game toy tracks (e.g., jumps, boost pads) as well as real-world race tracks (e.g., safety zones, run-off areas). In some embodiments invisible tracks 100 may include other features, including 3D features (e.g., corkscrews, roller coaster elements), as well as combinations of the examples above.

Figure 8:
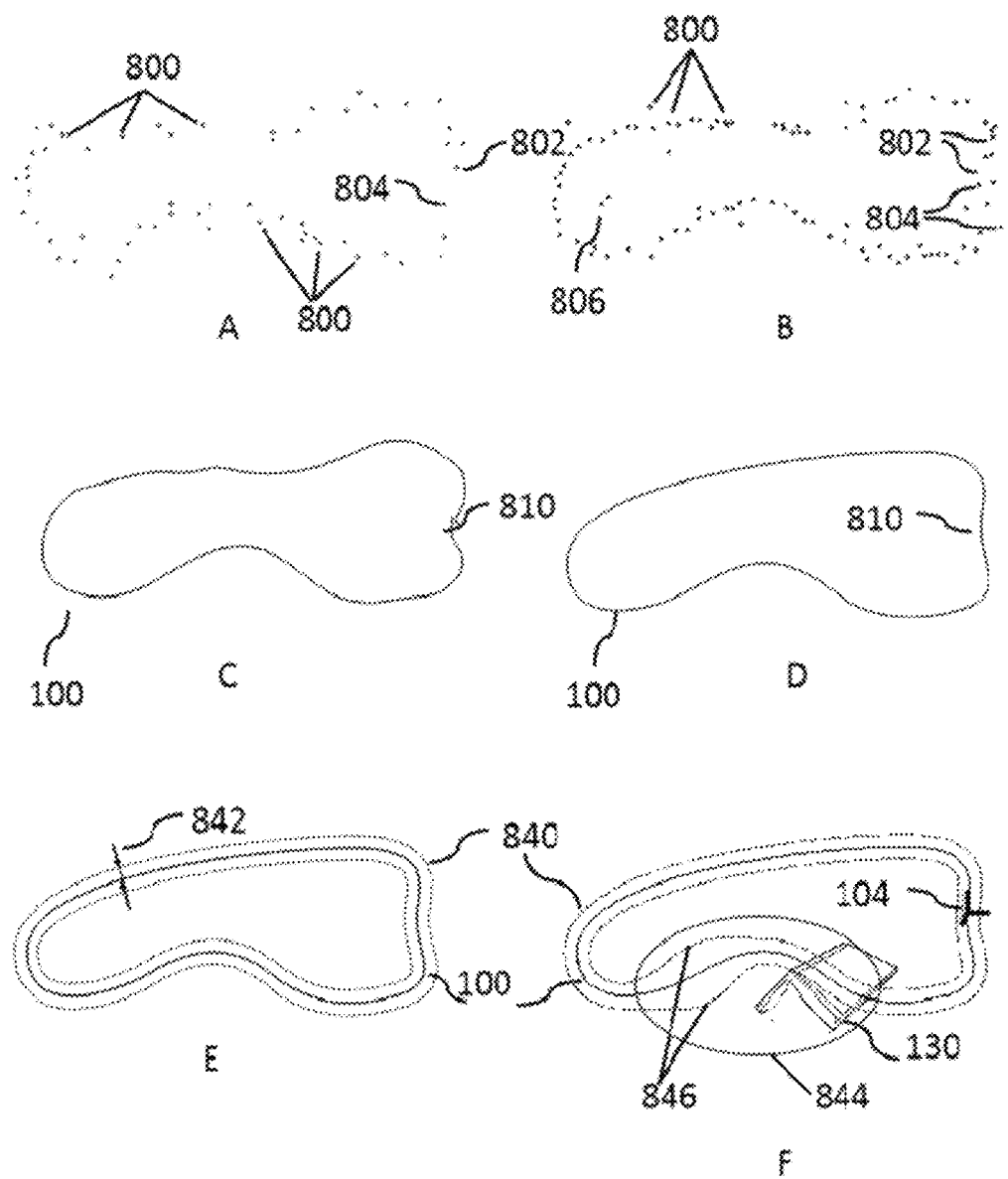
FIGS. 8A to 8F show a graphic representation of six exemplary actions for explaining the creation and use of an invisible track.

FIG. 8 illustrates six exemplary actions for creating an invisible track 100 or invisible track segment 602 by processing sensor data. FIG. 8A shows position data points 800 extracted from sensor measurements recorded during a first instance of guiding a mobile robot 110 around a desired course 100, including a first recorded data point 802 and a last recorded data point 804. The data points are typically corrupted by noise and therefore may not perfectly match a user's desired track 100.

FIG. 8B shows additional noisy measurements from later instances of guiding a mobile robot 110, with each instance similarly including a first recorded data point 802 and last recorded data point 804. The figure also shows outliers 806, which may, for example, be determined based on a statistical measure (e.g., a nearest neighbor distance) or a quality metric of a received signal (e.g., a signal-to-noise ratio).

FIG. 8C shows a continuous representation of an estimated invisible track 100 computed by fitting a smooth path through the recorded data points. This can, for example, be achieved by fitting a set of target functions (e.g., by matching track segments with a library of primitives such as straight lines, curves with a specific radius, surfaces, etc.) to approximate the recorded data points using least squares. In some embodiments other methods including interpolation, extrapolation, regression analysis, and curve fitting may be used to convert the data points into a continuous path suitable for use with the invisible track. In some embodiments the quality of this first, continuous representation shown in FIG. 8C may be improved by merging additional sensor information from multiple instances of guiding a toy car or using other methods, such as filtering sensor signals. Such processing is typically performed by the interactive mobile robot systems' processing circuitry, in particular by the interactive mobile robot system's evaluation units 506 and sensing units 508, but may also be performed in part or in full by other units such as the input unit 502.

FIG. 8D shows an improved version of a desired invisible track 100. Improvements may be achieved by adding additional data (e.g., data on the location of waypoints or anchors 140, data from previously created tracks, data on obstacles 130, data from a user 120, data added through software, or data collected during use of the track), by using statistical data processing (e.g., removing outliers 806), by accounting for structure in the data (e.g., considering kinematic constraints imposed by the steering geometry of a mobile robot), by making assumptions on properties of the track (e.g., a flat track surface), by performing further exemplary processing actions (e.g., projecting it on a flat surface), by including information from other sensors (e.g., wheel encoders), or by leveraging other data, such as desired start and end points of an invisible track 100 created by a user 120 while guiding a mobile robot 110, either by pressing a button or by otherwise interacting with the mobile robot 110. Moreover, constraints imposed by the intended use of the track or by a designer can further help improve the quality of the estimated desired invisible track 100. For example, for most racing games a closed-loop track, where start points indicated by the first recorded data points 802 match endpoints indicated by the last recorded data points 804, as well as a smooth course with a large minimum radius as shown in FIG. 8D may be useful, and the desired track 100 may be adjusted accordingly.

FIG. 8E shows how this desired track 100 may be grown by a fixed distance 842 useful for delineating a toy race track, for establishing a toy's operating margins, or to achieve a desired track width 840.

In some embodiments the desired track 100 may be grown by a fixed radius to form a hose-shaped three-dimensional track, which may be useful for some applications such as flying mobile robots. In some applications, it may be useful to create a track around, or based on, an invisible track 100 by accounting for properties of the track such as the radius of a corner in a hairpin turn (e.g., to extend the width of the track 840 on the outer side of the turn), or for the mobile robot's 110 expected dynamics (e.g., to reduce the track width 840 to account for a more accurate tracking of the desired path at lower speeds). In some embodiments it may further be useful to compute, re-compute, or adapt the shape or other properties or attributes of an invisible track 100 at runtime (e.g., to account for a specific maneuver such as one mobile robot overtaking another, or to account for a change in surface friction such as moving from a carpet on to a hardwood floor, or to account for moving obstacles).

FIG. 8F shows the invisible track 100 superimposed on the original scene of FIG. 1 by using the coordinate system 104 to match invisible track positions, which may include orientations, velocities or accelerations to match the positions, and possibly orientations, velocities or accelerations, of the real world course. The resulting computed invisible track 100 is an invisible representation linked to, but not identical to, a desired real-world path. Positions, orientations, velocities or accelerations of an invisible track do not necessarily directly correspond to positions, orientations, velocities or accelerations in the real world, either accidentally (e.g., due to noisy sensor data or a misaligned coordinate system 104) or by design (e.g., they may be intended to be translated into movements along the course by the interaction of a mobile robot's controller 214 with an invisible track 100).

FIG. 8F shows a special section 844 of the track 100. This section 844 has been further refined to account for the three dimensional nature of the desired course to explicitly allow for the toy 110 movement in the third dimension when racing across the obstacle 130. This can, for example, be achieved by relaxing position constraints stored as attributes of an invisible track 100 or by adapting the track shape in the third dimension as shown in FIG. 8F by setting attributes accordingly. Moreover, the invisible track's width 840 has been increased behind the obstacle 130 to create a landing zone 846 to account for the randomness and loss of control during and after a jump. In some embodiments a special track location such as a go-to point (not shown) may be defined and used as a set point for the car's controller in order to return the car to an appropriate position and orientation on the track following a loss of control. This may, for example, be achieved by storing a desired waypoint that should be reached at a specific time after the jump as an attribute added to an invisible track 100.

FIGS. 9A to 9G explain how invisible track segments may be used to extend an existing invisible track, and how multiple invisible track segments may be connected into a single invisible track.

FIG. 9A shows an example invisible track 100 containing a start, finish and lap line 910 that may be used in a robot race.

FIG. 9B shows an additional segment 906 that is to be added to extend an invisible track.

FIG. 9C shows how the previous invisible track 100 may be split up into multiple segments to accommodate the new addition 906, resulting in an invisible track composed out of three invisible track segments, each slightly more complex than the examples shown in FIG. 7.

FIG. 9D shows the three invisible track segments disassembled and with their start and end points (or "vertices") marked. In particular, the first segment 902 starts at point A and ends at point B, the second segment 904 starts at point C and ends at point D, and the third segment 906 starts at point E and ends at point F.

FIG. 9E shows the three invisible track segments connected, with connections between the vertices B, C, and E as well as A, D, and F.

FIGS. 9F and 9G show an example of how these topological connections between invisible track segments may be represented and stored. FIG. 9F shows how each of the vertices A to F may be stored as elements in an array. FIG. 9G shows how the connections between vertices B, C, and E as well as A, D, and F may be stored by listing vertices that are adjacent in a second array (or matrix): Pairs of vertices connected by an edge are marked with a 1 in the array, while the array elements for non-connected pairs of vertices are 0.

Many other implementations for storing graphs that have various advantages (e.g., for efficiently adding or removing edges or vertices) exist in the prior art and may be usefully applied to certain embodiments of the present invention.

Figure 9:
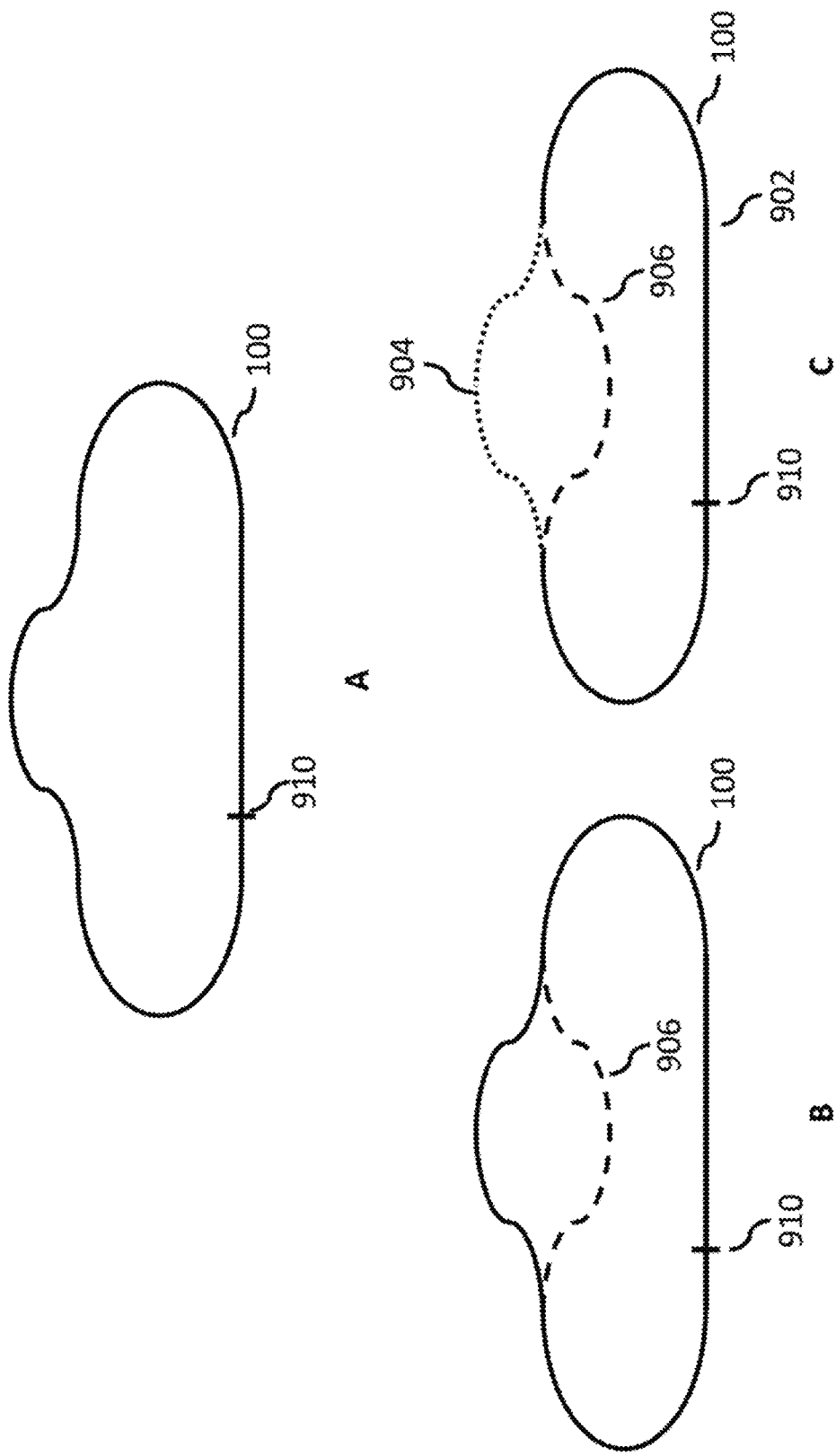
FIGS. 9A to 9G show an example of how invisible track segments may be connected to form an invisible track.
Figure 9:
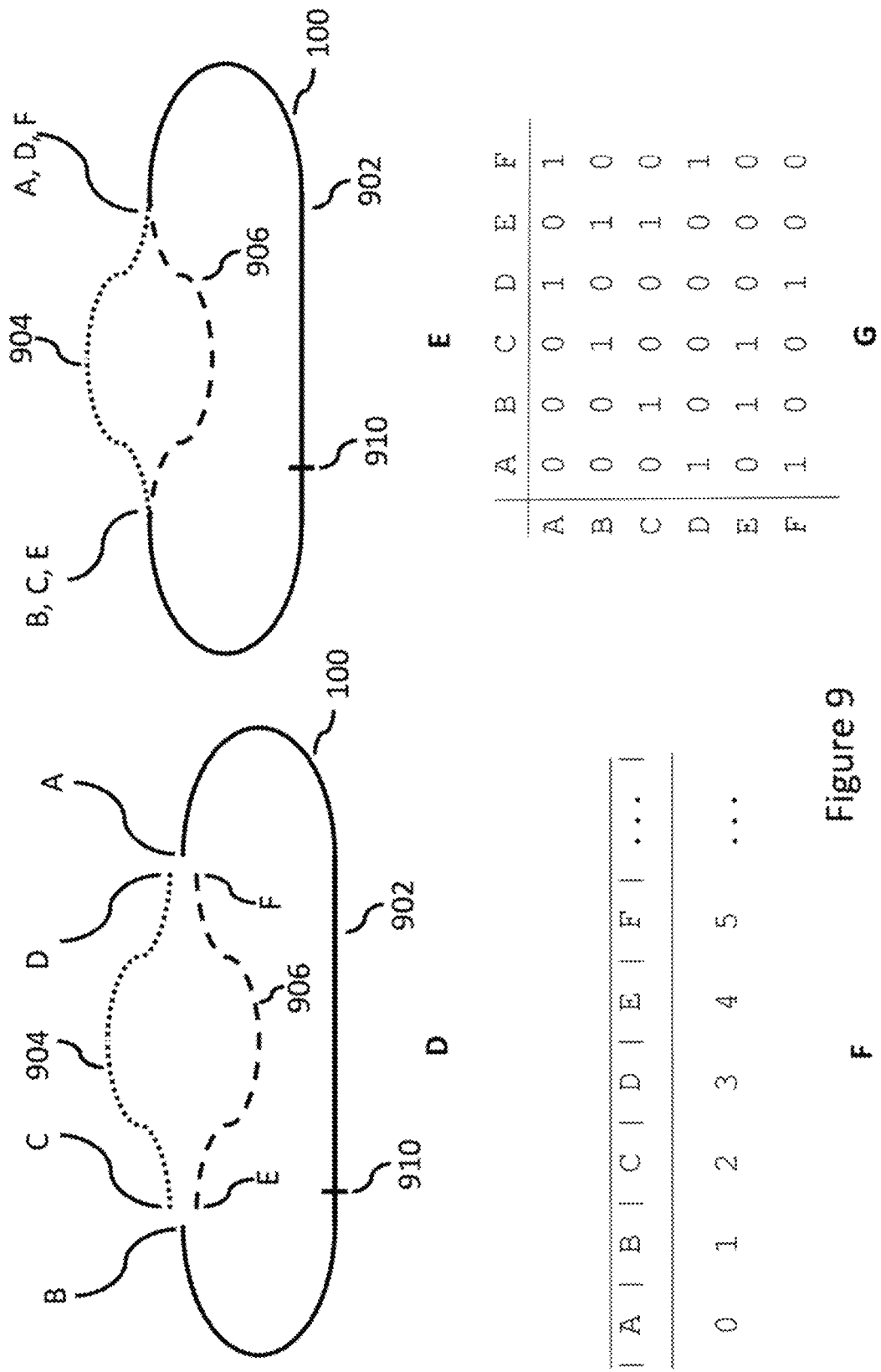

The connections between invisible track segments outlined in FIG. 9 may be achieved in a variety of ways. For example, multiple invisible track segments 602 may be connected based on time (e.g., track segments may be connected in the order in which they were recorded); based on distance (e.g., all track segment start or end points found within a certain distance of each other may be connected); based on their direction (e.g., track segment start points may only be connected to track segment end points); based on their connections (e.g., each track segment start or end point may only be connected to exactly one other track segment start or end point); based on user input (e.g., only track segment start or end points that have been marked by a player as fork or merging points may be connected to more than exactly one other track segment start or end point); or accounting for constraints (e.g., track segments may be connected depending on a desired overall topology, or track segment connections may be chosen such that all segments may be connected in a single invisible track, or a resulting invisible track may be required to form a loop).

In some embodiments track segments may be connected such that a local property of the connection of two invisible track segments is minimized or maximized (e.g., two track segments may be selected and connected to minimize the resulting track's curvature); or such that an overall property of an invisible track is minimized or maximized (e.g., track segments may be connected in such a way as to minimize the total length of the resulting invisible track).

In some embodiments track segments may be connected according to user commands or automatically. In some embodiments track segments may be connected while they are recorded or in batch or post-processing.

In some embodiments each track segment is converted to one of multiple track segment primitives. For example, a segment may first be rotated and scaled so that its start and end points match the positions of start and end points of track segment primitives stored in a database, the segment's curve may then be used to calculate an error score (e.g., based on a least squares comparison) against all primitives stored in the database, and the segment may then be substituted with a rotated and scaled version of the track segment primitive with the lowest error score.

In some embodiments single track segments may be split into multiple track segments to create additional connection points. For example, if the end point of a first track segment is found outside a certain maximum distance of all other track segment start points but within a certain maximum distance from a second track segment, this second track segment may be split up into two track segments by introducing a new start point and end point, and the end point of the first track segment may be connected to these newly created start and end points.

Moreover, in some embodiments multiple invisible tracks may co-exist in any given space, and may be used simultaneously. For example, each user 120 may have their own invisible track 100. If multiple invisible tracks are used simultaneously, they may either be used independently of each other, or partially joined, or they may be interacting based on some rule. For example, if two invisible tracks are used simultaneously and independently, two mobile robots moving along the two tracks may collide. However, by exchanging information between the two interactive mobile robot systems (e.g., by communicating information from one mobile robot to another, or by using the same anchors for both invisible tracks), mobile robots may, for example, be made to automatically obey traffic rules to avoid collisions. This may be achieved by storing such rules as attributes in one or both invisible tracks 100 and by configuring the processing circuitry of both interactive mobile robot systems to account for the traffic rules.

As will be readily apparent to one skilled in the art from those figures and descriptions, many other ways of connecting, converting, refining, and using invisible track segments and invisible tracks are possible. Moreover, while specific ways have been enumerated, various embodiments may include all, some, or none of the enumerated ways and may be used with invisible tracks, with invisible track segments, or both. Moreover, in some embodiments track segments may be connected based on any combinations of the ways or based on other ways. Moreover, these ways may be used simultaneously or as part of distinct, subsequent actions. For example, an invisible track may be created by creating a first invisible track by using splines to connecting all segments' start and end points in the order they were recorded, by creating a second invisible track by using splines to connecting all segments' start and end points such as to minimize the total length of the resulting invisible track, and by then choosing the one of the two invisible tracks that has the lowest maximum curvature.

Figure 10:
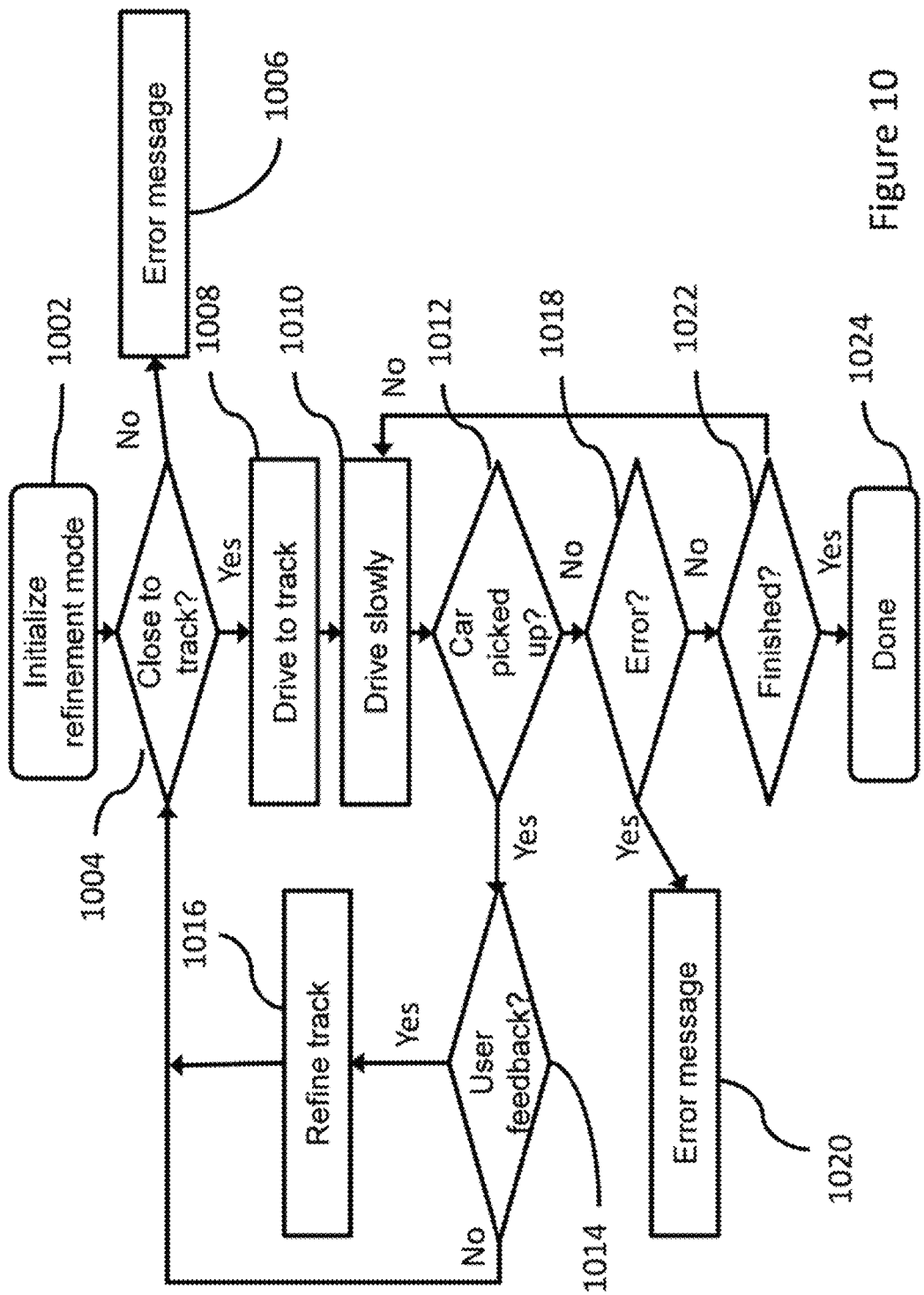
FIG. 10 shows a flowchart for explaining an example of refining an invisible track.

FIG. 10 shows a process for refining an invisible track 100 without the need for programming, a graphical user interface, or a remote control device. Instead, refinements may be made directly to the invisible track by moving the mobile robot 110. In some embodiments a user or an algorithm (e.g., a machine learning algorithm) may also observe the mobile robot 110 while it autonomously or semi-autonomously follows the track through the course defined by the invisible track. Observation may be used to determine desired refinements or to test a track 100 (e.g., for feasibility, for determining position-dependent environmental properties (e.g., floor friction, lighting), or as part of game play).

A refinement mode is usually used immediately after the recording of an invisible track. It may be used to check whether the recorded invisible track meets the user's requirements or to debug the recorded track. To start the refinement process, a user initializes a refinement mode 1002, for example via a button on the mobile robot. The mobile robot may then automatically determine whether it is close to the track 1004 using position information to determine its current position. If the mobile robot is sufficiently close to the track, the control unit 504 may be used to drive the mobile robot to the track 1008 and start following the track 1010. This following movement 1010 may be performed at the original speed, but in some cases (e.g., if a particular movement is very fast), a user may want to reduce or, in other cases, accelerate the playback of the movement stored in the invisible track, for example by using a speed switch on the mobile robot or by using a remote control.

If the mobile robot is too far away from the invisible track or fails to reach it, e.g. because it collides with an unexpected obstacle, an error message 1006 is sent to the user. Alternatively, the process illustrated in FIG. 10 may be extended by adding a homing behavior, which may allow the robot to attempt to return to the track. For example, if the mobile robot's evaluation unit fails to determine the robot's current position (e.g., because the one or more wireless signals are lost), the control unit may be used to steer the mobile robot back into the direction of the invisible track by computing an appropriate orientation of the mobile robot, by sending control signals to rotate the mobile robot, and by using dead reckoning to move the mobile robot into the direction of the invisible track. If the current position is recovered before a timeout, the control unit may then resume normal operation. If not, then the control unit may stop the mobile robot, e.g. by calling an emergency stop routine.

The mobile robot then moves along the invisible track guided by the control unit 1010 until either a user signal that indicates a desired change (e.g., a pick-up event 1012 detected by the evaluation unit based on sensor data), or an error message 1018 (e.g., triggered by a collision detected by the evaluation unit based on sensor data), or a termination command 1022 (e.g., received by the input unit as a result of a user pressing a button) is received. If a user signal indicating a desired change 1012 is to be triggered automatically (e.g., by a pick-up event rather than a user button), the signal may first be checked for its authenticity 1014 (e.g., by an evaluation unit 506 that compares the pick-up signal against previous user signals or typical signals received by the robot while under the control of the control unit 504 stored in a memory unit 510). This is particularly important when the mobile robot is following the invisible track for the first time, because the observed sensor signals while the mobile robot is moving under the control of the control unit may be substantially different from those previously recorded during manual motion of the mobile robot by the user. If the signal is determined as authentic 1014, the user may refine the invisible track, for example by moving the mobile robot along an alternative path until this path intersects with the track, and the new path is connected to form a new complete invisible track using one of the ways described above.

A refinement operation may also be automatically requested. In some embodiments a user may be guided through the process of improving a track by using spoken feedback during the guiding process, or at other moments during gameplay. For example, the interactive mobile robot system may ask a user to add waypoints to specific sections of the track (e.g., "Please add waypoints to improve the third left turn"). This may be achieved by using an evaluation unit 506 to evaluate the quality of the recorded data, by comparing the quality to an error criterion stored in a memory unit 510, and by using a control unit 504 to request user feedback 528.

Invisible tracks may also be refined automatically, either based on the detected dynamics while the robot is moving autonomously under the control of a control unit, or semi-autonomously under partial control of the control unit and partial user control. Such automatic refining may allow the mobile robot to improve its performance, for example by learning successful control commands from a user when they are remote controlling the mobile robot or e.g., based on the distance of detected obstacles while racing autonomously. In some embodiments an invisible track may be continuously refined further during use. For example, additional data may by recorded from one or more toy cars racing along the track. This data may then be processed and merged with previous data of an invisible track, and an updated invisible track may be computed that incorporates the additional sensor data.

Automatic refining may be achieved by using data processing or algorithmic methods including machine learning. Depending on the type of machine learning algorithm used, multiple iterations may be used to iteratively increase the performance of the mobile robot while following the invisible track. For example, a mobile robot may exhibit undesirable dynamics when following an invisible track, and the track's attributes (e.g., speed, acceleration, etc.) may be slowly altered to iteratively decrease the occurrence of such dynamics, e.g. by reducing the speed or acceleration for sections of the invisible track where the undesired dynamics were detected (e.g., by using an evaluation unit 506 to compare the sensor signals during the mobile robot's movement to nominal, desired sensor signals stored in a memory unit 510). Conversely, the interactive mobile robot system may emit user alerts 528 (e.g., an audio warning), e.g. if a player drives their car too slowly before a jump. As another example, a user may repeatedly skid off the track in a specific section of the course, and the invisible track may be slightly expanded to help a user master this section of the course. As another example, data from a user (e.g., a skillful maneuver to navigate a jump or turn) may be used to improve an invisible track used by an autonomously steered opponent toy. This may be achieved by merging the recorded position information corresponding to the user data with that of the invisible track either when receiving user instructions 524 to improve the invisible track or automatically. Such an additional refinement phase may use a special test control program, which may be added to the flowchart in FIG. 10, for example by adding additional stages including the actions "Start testing", "Execute test control program", and "Stop testing" (none shown) after computing an invisible track. In some embodiments, such a test control program may also allow a user to test the quality of, troubleshoot, refine, or otherwise edit or improve an invisible track or its segments.

Refinements may concern all aspects of an invisible track, including e.g. its properties or attributes. The process shown in FIG. 10 may be adapted accordingly to allow for the addition or removal of waypoints by adding actions that alert the user of the presence of a waypoint (e.g., a light or audio signal) and actions that allow a user to replace the waypoint with a new one (e.g., by pressing a corresponding button). As another example, the process may be adapted to allow for "override waypoints" that are added into and merged with an existing track with stronger weight. Other actions, such as automatic fading of older waypoints e.g., based on time or spatial proximity, may also be added. As yet another example, a user may change the scale of an invisible track using a rescaling action. In some embodiments refinements may also be made using an on-screen representation on a computer, tablet, smartphone, or other digital device. For example, a user may delete or edit a previous waypoint. Other adaptations will be readily apparent to a person skilled in the art. In some embodiments all, none, or some of the refinements described above may be used.

Figure 11:
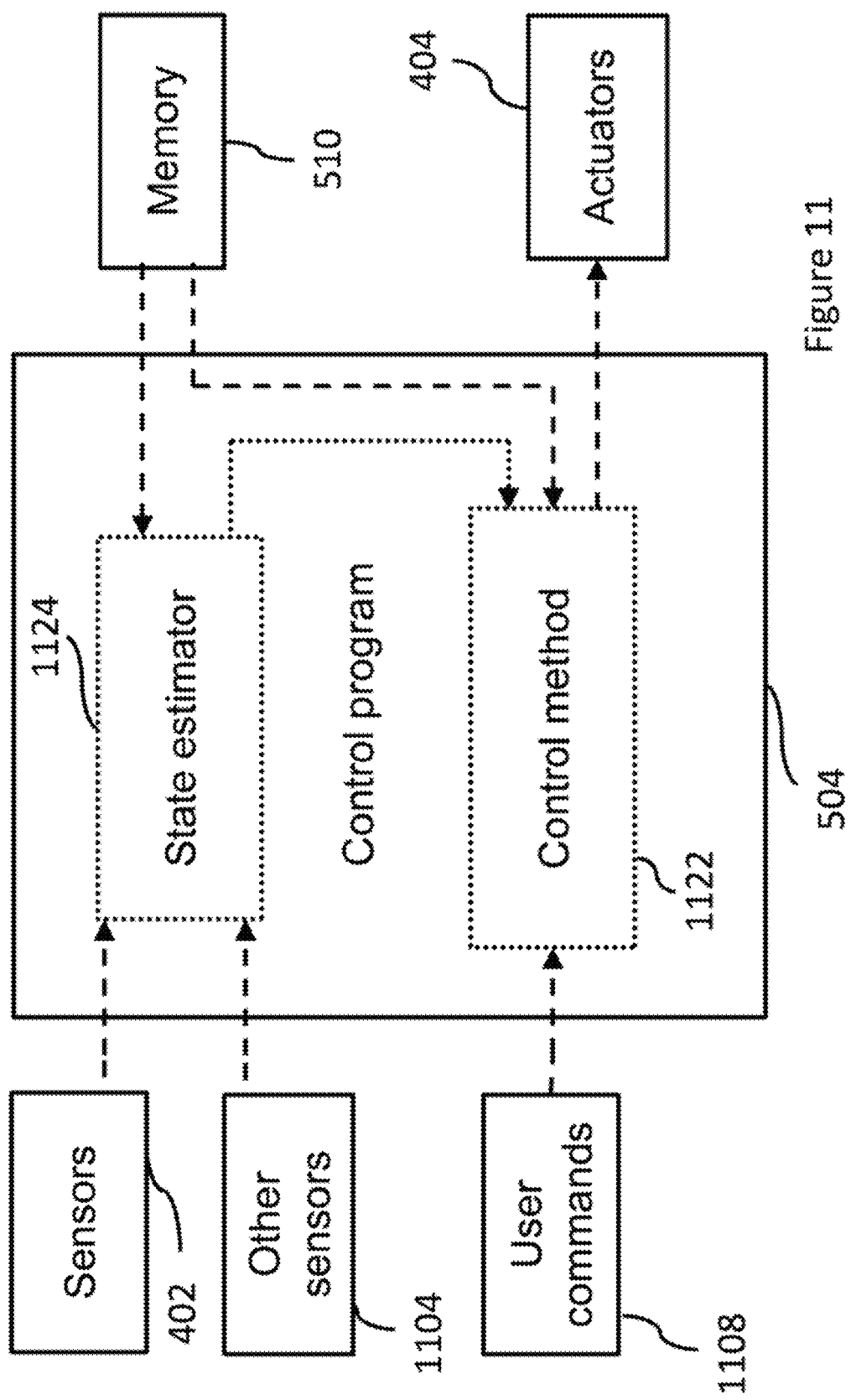
FIG. 11 shows a block diagram of an example control diagram to be used with an invisible track.

FIG. 11 shows a block diagram of an example control scheme that may be used in conjunction with an invisible track to control a mobile robot.

In some embodiments, control may be achieved by using a numerical method to compute a state estimate 1124 including, for example, the position, orientation, velocity, or acceleration of the mobile robot, during gameplay. In some embodiments this computation may be performed based on sensor measurements 402, 1104, typically provided via an input unit 502 and the computation may provide data representative of at least one of a position, orientation, velocity, acceleration, or rotational rate of a toy.

In some embodiments, and depending on the specific requirements and use case, controlling may be achieved by computing an estimate using an estimator 1124. Some methods that may be used to form the estimate 1124 known in the prior art include one or multiple Luenberger Observers, Kalman Filters, Extended Kalman Filters, Unscented Kalman Filters, and Particle Filters, and combinations thereof. In some embodiments, forming a state estimate may comprise sensor fusion. In some embodiments, proper state estimates allow to correct for incorrect model assumptions, such as momentary wheel slip, providing valid short time-frame estimates and allowing for override procedures to be activated if necessary.

In some embodiments, based on the state estimate 1124 or user input 1108, a control method 1122 (e.g., feedback control) may provide control inputs to at least one of a mobile robot's actuators 404. The feedback control may be designed to control the position or orientation of a mobile robot in a body coordinate system and may consist of parallel or cascaded feedback control loops. Depending on the specific requirements and application, methods that may be used to compute an actuator control signal 526 include linear or nonlinear state feedback, model predictive control, and fuzzy control.

Depending on the goal or intended use of an invisible track 100, a wide variety of other control programs with varying functioning and complexity may be used. For example, a simple control program 504 may simply issue an alert when the car's position is outside the track, or monitor its speed, or add a bias to the steering direction of the mobile robot's front wheels so that the robot will tend to steer back towards the center of an invisible track. Moreover, a car's controller may receive set points from an invisible track to set the car's desired position, orientation, velocity, or acceleration. More complex control programs may, for example, implement semi-autonomous or autonomous steering along an invisible track based on sensor information or provide in-depth feedback on the motion and movement of a mobile robot while it is manually guided or semi-autonomously or autonomously moving along the invisible track. Yet other control programs 504 may implement a large variety of game play modes, such as a race mode on a stunt course, or a model traffic simulation, and many others well known from existing racing games.

For example, when a mobile robot is fully under the control of the control unit 504, a control method 1122 may be used to control both speed and steering based on the invisible track and the current position. Autonomous control may make a certain maneuver of a robot repeatable (e.g., it may allow a player to set up and fine-tune a jump of their toy car over an obstacle). A control unit 504 may also be used to control predetermined interactions of two or more mobile robots (e.g., including series of interactions such as "overtake" maneuvers). In a game, this may, for example, allow to implement invisible drafting when a first car follows closely behind a second car for a predetermined amount of time. Moreover, a control method 1122 may allow to simulate a temporary change in a toy car's properties (e.g., speed increases, speed decreases, oil spill effect) which may be initiated in various ways (e.g., by using an optical sensor identifying a pattern on the ground or by markers).

As another example, a control unit 504 comprising an estimator 1124 may be used to provide an internal model for the movements of a toy car which can then be used by an evaluation unit for comparison with a toy car's actual motions to determine if a player is cheating or if the car has been in a collision with an obstacle or with another car.

As another example, a control unit 504 comprising an estimator 1124 may be used together with a dynamic model of a toy car to determine how quickly the toy car can follow a given invisible track. This can, for example, be achieved by comparing the acceleration caused by going through a turn in the invisible track at a certain speed to the maximum acceleration the car allows (e.g., because of its tire friction). This can be achieved through first-principles models (e.g., by computing the acceleration based on physical laws), simulation (e.g., by using a computational model to determine the acceleration), or observation (e.g., by measuring the acceleration achieved by the car, using sensors). This information may then, for example, be used to implement an automatic speed limit (e.g., stored as an attribute) by comparing the actual speed to the determined maximum speed using an evaluation unit, and by limiting the speed using a control unit (e.g., by performing antipicitory breaking maneuvers). A dynamic model may be data-driven or based on first principles. It may be improved using machine learning. It may be improved using simulation.

Figure 12:
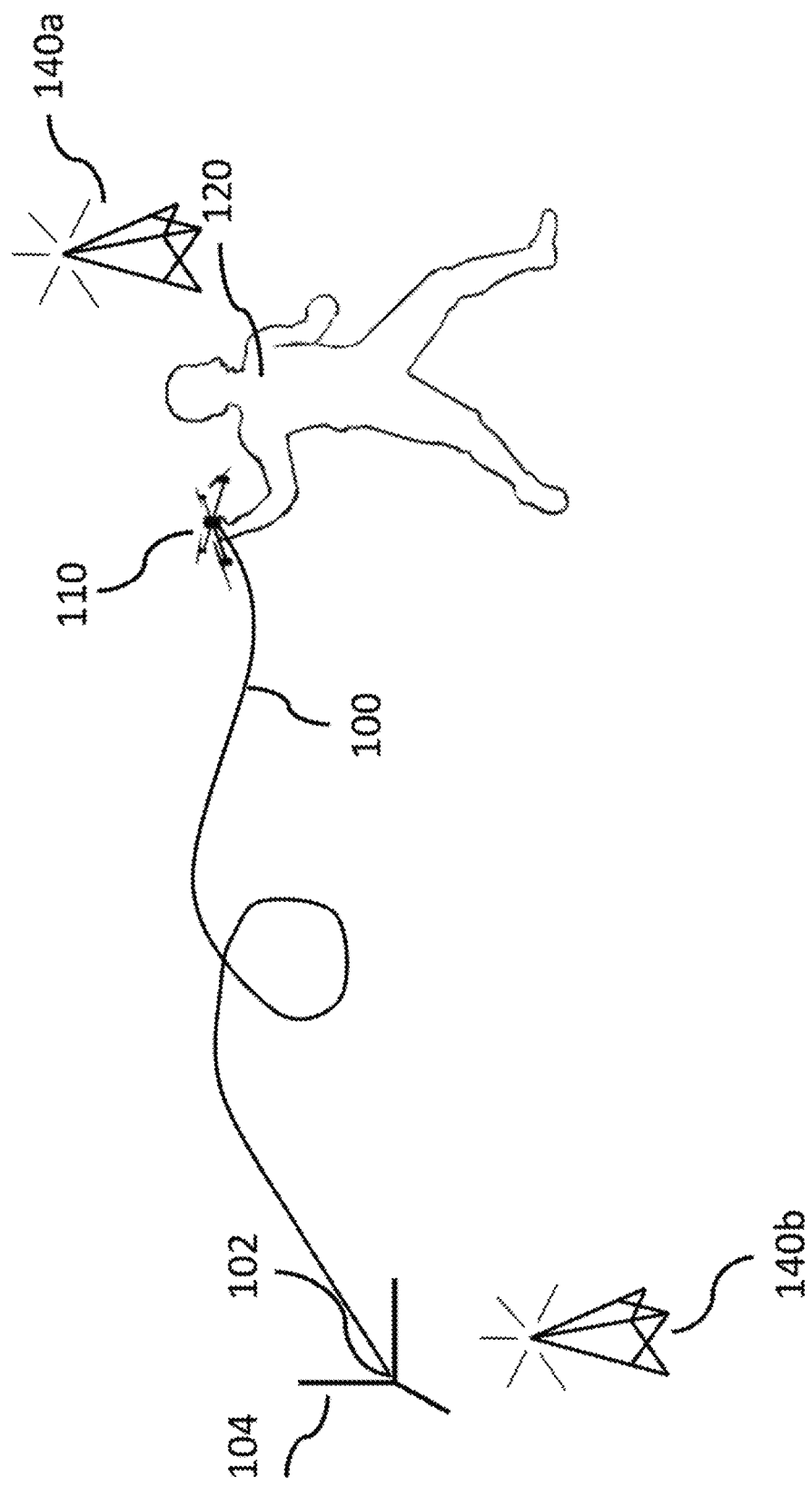
FIG. 12 shows a further example embodiment of a user creating an invisible track using a mobile robot.

FIG. 12 shows an alternative exemplary embodiment of a user 120 creating an invisible track 100 by manually guiding a mobile robot 110, where the mobile robot is a flying robot. Positioning anchors 140 are set up in the vicinity of the desired track and used for sensing.

While certain aspects of the present invention have been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

FIGURE NUMERALS

100 Invisible track
102 Origin (or "start of recording" or "desired start location")
104 Coordinate system
110 Mobile robot (or "toy")
120 User (or "player")
130 Obstacle
140 Positioning anchor (or "beacons" or "wireless transmitters")
140*a* First anchor
140*b* Second anchor
150 Remote control
210 Waypoints
212 Movements
302 Start recording
304 Record sensor readings
306 Stop recording
308 Add another recording?
310 Compute invisible track
312 Start tracking
314 Execute control program
316 Stop tracking
402 Sensors
404 Actuators
406 Control module
408 User interface (or "player interface") with buttons
410 Light (or "LED")
412 Speaker
414 Battery
416 Antenna
502 Input unit
504 Control unit
506 Evaluation unit
508 Sensing unit
510 Memory unit
522 Sensor signals
524 Command signals
526 Control signals for actuators
528 User feedback
530 Communication signals
602 Invisible track segments
800 Data points
802 First recorded data point
804 Last recorded data point
806 Outliers
840 Track width
842 Fixed distance used to define the track width 840
844 Special track section 846 Landing zone
902 First invisible track segment
904 Second invisible track segment
906 Additional invisible track segment
910 Start location
1002 Initialize refinement mode
1004 Close to track?
1006 Error message
1008 Drive to track
1010 Drive slowly
1012 Car picked up?
1014 Player feedback?
1016 Refine track
1018 Error?
1020 Error message
1022 Finished?
1024 Done
1104 Other sensors
1106 Memory
1108 User commands
1122 Control method
1124 State estimate

The invention claimed is:

1. An interactive mobile robot system, comprising:
a flying mobile robot;
receiver circuitry configured to receive one or more position signals; and
processing circuitry coupled to the receiver circuitry, wherein the processing circuitry is configured to:
receive at least one of a signal from a remote control device or a signal triggered by a physical interaction between a user and the flying mobile robot;
determine position information associated with the flying mobile robot based on the one or more position signals;
create an invisible track in a coordinate space based on the position information;
determine a current position of the flying mobile robot in the coordinate space based on at least one of the one or more position signals;
receive a user input signal; and
generate one or more control signals based on the current position of the flying mobile robot, the invisible track, and the user input signal, wherein the one or more control signals affect movement of the flying mobile robot to follow the invisible track semi-autonomously.

2. The interactive mobile robot system of claim 1, further comprising an actuator operationally coupled to the processing circuitry, wherein the actuator is structured and arranged to allow controlling at least one of a speed of the flying mobile robot and a direction of the flying mobile robot based on at least one of the one or more control signals.

3. The interactive mobile robot system of claim 1, wherein the processing circuitry is further configured to autonomously control the movement of the flying mobile robot to cause the flying mobile robot to follow the invisible track based on the one or more control signals.

4. The interactive mobile robot system of claim 1, wherein the position signals are wireless signals, and wherein the receiver circuitry comprises at least one antenna.

5. The interactive mobile robot system of claim 4, wherein the wireless signals are ultra-wideband localization radio signals and the receiver circuitry is further configured to receive the wireless signals from at least two wireless transmitters.

6. The interactive mobile robot system of claim 1, wherein the invisible track comprises one or more attributes each associated with a location or segment of the invisible track.

7. The interactive mobile robot system of claim 6, wherein the one or more attributes comprise one or more of a desired robot orientation, desired robot velocity, desired robot acceleration, desired track width, desired time, and desired time sequence.

8. The interactive mobile robot system of claim 1, wherein the invisible track comprises a single continuous path.

9. The interactive mobile robot system of claim 1, wherein the invisible track comprises:
at least one fork that leads to at least two alternative paths; and
at least one merge that combines at least two alternative paths to a single path.

10. The interactive mobile robot system of claim 1, wherein the invisible track comprises one or more of invisible track segments and waypoints.

11. The interactive mobile robot system of claim 1, wherein the processing circuitry is configured to:
determine the position information at a plurality of locations in the coordinate space; and
create the invisible track in the coordinate space by fitting a plurality of track segments to the plurality of locations.

12. The interactive mobile robot system of claim 1, wherein the processing circuitry is further configured to refine the invisible track based on at least one of user instructions, dynamics of the flying mobile robot, and detected obstacles.

13. The interactive mobile robot system of claim 1, wherein the flying mobile robot is prepared and adapted for manual guiding by the user and the position information is determined based on the manual guiding.

14. The interactive mobile robot system of claim 1, wherein:
the receiver circuitry comprises at least one antenna;
the receiver circuitry is configured to receive at least two wireless position signals from at least two positioning anchors; and
the position information comprises positioning data associated with the flying mobile robot at each of multiple positions along a desired path.

15. A method for creating an invisible track for a flying mobile robot, the method comprising:
receiving, using processing circuitry of the flying mobile robot, at least one of a signal from a remote control device or a signal triggered by a physical interaction between a user and the flying mobile robot, which is an indication to start recording an invisible track,
receiving, using the processing circuitry, first position information of the flying mobile robot wherein the flying mobile robot was positioned at a first position by the user,
receiving, using the processing circuitry, second position information of the flying mobile robot wherein the flying mobile robot was positioned at a second position different from the first position by the user,
creating an invisible track in a coordinate space based on at least one of the relative time sequence, distance, and direction of the first and the second position information,
receiving, at the flying mobile robot, a user input signal, and
generating, using processing circuitry of the flying mobile robot, one or more control signals based on a current position of the flying mobile robot, the invisible track, and the user input signal, wherein the one or more control signals affect movement of the flying mobile robot to follow the invisible track semi-autonomously.

16. The method according to claim 15, wherein the first and second position information of the flying mobile robot are generated based on one or more of movement of the flying mobile robot and a press of a button.

17. The method according to claim 16, wherein the motion is one or more of a manual guiding motion of the flying mobile robot along a track segment and a repetitive motion comprising one of a back-and-forth motion, a spinning motion, and a tapping motion.

18. The method according to claim 15, further comprising receiving an indication to execute a control program, executing the control program, and receiving an indication to stop executing the control program.

19. The method according to claim 18, wherein
the invisible track is a three dimensional invisible track,
the first and the second position information are each determined in dependence of multiple position signals and multiple onboard sensor signals, and
the control program controls the movement of the flying mobile robot in dependence of one or more position signals, one or more onboard sensor signals, one or more attributes, one or more global properties, and one or more user control inputs such that the flying mobile robot follows the invisible track semi-autonomously.

20. The method according to claim 15, wherein the first and the second position information are each determined in dependence of multiple wireless position signals received from multiple positioning anchors.

* * * * *